US012116968B2

(12) United States Patent
Shetty et al.

(10) Patent No.: US 12,116,968 B2
(45) Date of Patent: Oct. 15, 2024

(54) DUAL ENERGY IGNITION SYSTEM WITH ON TIME ENERGY TRANSFER AND A METHOD THEREOF

(71) Applicants: M. Hariprasad Shetty, Bangalore (IN); M K Gunasekaran, Bangalore (IN)

(72) Inventors: M. Hariprasad Shetty, Bangalore (IN); M K Gunasekaran, Bangalore (IN)

(73) Assignees: M. Hariprasad Shetty (IN); M K Gunasekaran (IN)

( * ) Notice: Subject to any disclaimer, the term of this patent is extended or adjusted under 35 U.S.C. 154(b) by 0 days.

(21) Appl. No.: 17/760,475

(22) PCT Filed: Mar. 25, 2021

(86) PCT No.: PCT/IB2021/052470
§ 371 (c)(1),
(2) Date: Aug. 10, 2022

(87) PCT Pub. No.: WO2022/167848
PCT Pub. Date: Aug. 11, 2022

(65) Prior Publication Data
US 2024/0026850 A1 Jan. 25, 2024

(30) Foreign Application Priority Data
Feb. 4, 2021 (IN) ............................ 202141004868

(51) Int. Cl.
*F02P 3/08* (2006.01)
*F02P 3/04* (2006.01)
(Continued)

(52) U.S. Cl.
CPC ............ *F02P 9/007* (2013.01); *F02P 3/0435* (2013.01); *F02P 3/0838* (2013.01); *H01F 38/12* (2013.01)

(58) Field of Classification Search
CPC .............................. F02P 3/0435; F02P 3/0838
(Continued)

(56) References Cited

U.S. PATENT DOCUMENTS 3,972,315 A 8/1976 Munden
5,197,448 A 3/1993 Porreca et al.
(Continued)

FOREIGN PATENT DOCUMENTS

GB 2608764 B * 9/2023 ............. F02P 15/10
IN 808/CHE/2003 11/2005

*Primary Examiner* — Christopher M Raabe
(74) *Attorney, Agent, or Firm* — Jason C. Cameron

(57) ABSTRACT

An ignition system for automobile industry is disclosed. The system includes a high voltage source to initiate the spark and a low voltage source to add additional energy to the spark and the initiation of the spark and adding of the additional energy to the spark is carried out while the primary winding of the transformer is conducting. This high energy ignition system is carried out using the transformer with a secondary high voltage winding. The spark generation and adding additional energy is carried out using both capacitive and inductive transfer system using the transformer. Different ways of generating high voltage are also disclosed. Both single switch method and two switch method and multiple switch methods are also disclosed. Current controlled spark generation and multiple pulse method are also disclosed. The system delivers more energy efficiently while the primary is on and with smaller transformer and faster current rise.

15 Claims, 16 Drawing Sheets

(51) Int. Cl.
*F02P 9/00* (2006.01)
*H01F 38/12* (2006.01)

(58) Field of Classification Search
USPC .......................................................... 313/11.5
See application file for complete search history.

(56) References Cited

U.S. PATENT DOCUMENTS

| | | | | |
|---|---|---|---|---|
| 6,191,537 | B1 * | 2/2001 | Celso | H05B 41/2883 315/276 |
| 6,553,981 | B1 | 4/2003 | Suckewer et al. | |
| 2014/0153295 | A1 * | 6/2014 | Ivankovic | H02M 3/3353 363/21.12 |

* cited by examiner

DUAL ENERGY IGNITION SYSTEM WITH ON TIME ENERGY TRANSFER AND A METHOD THEREOF

CROSS-REFERENCE TO RELATED APPLICATION

This application claims priority from a patent application filed in India having Patent Application No. 202141004868, filed on Feb. 4, 2021, and titled "A DUAL ENERGY IGNITION SYSTEM WITH ON TIME ENERGY TRANSFER AND A METHOD THEREOF" and a PCT Application No. PCT/IB2021/052470 filed on Mar. 25, 2021, and titled "A DUAL ENERGY IGNITION SYSTEM WITH ON TIME ENERGY TRANSFER AND A METHOD THEREOF".

FIELD OF INVENTION

Embodiments of the present disclosure relate to industrial and automobile industry where high energy spark is generated using two energy sources in a spark plug, and more particularly to an ignition system used in the automobiles to deliver extra energy to the sparkplug so that the better combustion is obtained.

BACKGROUND

In automobiles, electrical ignition system is used to ignite the fuel air mixture. This ignites the air-fuel mixture and generates power in the cylinder. For good complete combustion it is essential to have high quality spark. The magnitude of the current in the spark and the duration of the current are important for the spark. High spark current and high spark duration gives good combustion. To produce spark across the spark gap we have to supply high voltage to the spark gap. In the conventional system high voltage is obtained from low voltage DC source like battery etc using a high voltage transformer. To generate high voltage, the low voltage primary of the transformer is charged inductively using a switch and then the switch is opened to produce high voltage in the secondary. The higher turns ratio of transformer produces high voltage spark but produces only very low current in the sparkplug. To increase the current at the spark dual source ignition system was proposed earlier. In this, two transformers are used with two switching energy sources. In this case, using first circuit and first transformer high voltage low current spark is initiated. Then using second circuit and second transformer low voltage and high current is pumped in to the already initiated spark. However, this method calls for two transformers and two electronic circuits. Two circuits add cost and extra power consumption. It also calls for extra diodes to combine the two currents at the spark plug.

In some of the existing ignition systems high voltage producing circuit and low voltage high current producing circuit are integrated using single transformer and a high voltage DC source. However, in this method low voltage source is added in series with the high voltage transformer in the secondary side using a control element in series with the sparkplug. Similarly, in other existing ignition system, separate DC booster source is added in series with the high voltage source at the secondary side of the transformer to increase the power in the spark which results in additional cost and extra power consumption.

Hence, there is a need for an improved ignition system to address the aforementioned issue(s).

BRIEF DESCRIPTION

In accordance with an embodiment of the present disclosure, an ignition system with dual energy source is provided. The system is configured to generate large current during on time to the ignition system used in the internal combustion engine using an integrated method, wherein high voltage spark initiating source and low voltage additional current adding source are integrated in cost effective manner.

Another aspect of the disclosure is the high voltage energy source and low voltage energy source are integrated using one single transformer with single primary and one single switching element Wherein the discharge circuit is arranged in such a way that the said energy sources are discharging to the single transformer in an orderly manner. The high energy source energy is supplied by the said transformer itself through additional winding. Energy transfer occurs both during on time and off time of the switch.

Yet another aspect of the disclosure is high voltage energy source and low voltage energy source are integrated using one single transformer with two primaries and one single switching element where in the said transformer is wound in way that one source will not interfere with other source. One winding of this transformer can be used to initiate the spark by discharging a capacitor or applying voltage to it and the other winding of the transformer can be used to add additional energy to the spark either discharging the capacitor or applying voltage to it.

Yet another aspect of the disclosure is high voltage energy source and low voltage energy source are integrated using a single transformer and two switching elements in such a way that the use of first switch discharges first capacitor to the primary to initiate the spark and use of the second switch discharges second capacitor to the same primary to add additional energy to the spark.

Yet another aspect of the disclosure is high voltage energy source and low voltage energy source are integrated using a single transformer and two switching elements in such a way that the first switch discharges first capacitor to the first primary to ignite the spark and the second switch discharges second capacitor to the second primary to add additional energy to the spark.

Yet another aspect of the disclosure is single transformer is wound in such a way that the voltage applied to the one primary will not produce any magnetic field in another primary and it avoids interaction between them. The said winding is split in to two equal parts and wound on the two outer legs of the E-I core of the transformer. This makes the magnetic flux due to the said winding will not flow through the center winding of the E-I core transformer.

Yet another aspect of the disclosure is high voltage energy source and low voltage energy source are integrated using a single transformer and two switching elements in such a way that the first switch allows the current to flow through the non-interactively wound transformer primary to initiate the spark and the second switch allows additional current to flow through the second primary to add additional energy to the spark.

Yet another aspect of the disclosure is high voltage energy source and low voltage energy source are integrated using a single transformer and two switching elements in such a way that the first switch discharges first capacitor through the non-interactively wound transformer primary to initiate the spark and the second switch discharges second capacitor to the second primary to add additional energy to the spark.

Yet another aspect of the disclosure is high voltage energy source and low voltage energy source are integrated using a single transformer and two switching elements in such a way that when first switch is switched on it ignites the spark due to the voltage applied to the first primary and when the second switch is turned on it delivers additional energy to the spark due to the voltage applied to the second primary. The high voltage source is supplied by the energy recovery winding used in the same transformer. Energy recovery also done through diode connected to the primary.

Yet another aspect of the disclosure is high voltage energy source and low voltage energy source are integrated using a single transformer in such a way that when the ignition pulse is applied it applies the high voltage to the primary for a short time to initiate the spark and then low voltage for the required duration to add additional energy to the spark using two switching elements. Energy recovery winding is also used to add energy to the high voltage source. Similarly, energy recovery diode is used to supply the recovered energy to the high voltage source. The current from the high voltage source can also be limited. The energy for the high voltage source may be obtained fully from the recovered energy.

Yet another aspect of the disclosure is high voltage energy source and low voltage energy source are integrated using a single transformer in such a way that when the ignition pulse is applied it produces series of pulses which are used to switch the switching elements in such a way that across the primary short pulses of alternate positive and negative are applied for the required duration using four switches in the bridge configuration. For every short pulse at the beginning using a fifth switch for a very short time first high voltage is applied to the transformer primary to initiate the spark. The short duration pulses are adding additional energy to the spark. Energy recovery diodes can also provide energy to the high voltage source.

Yet another aspect of the disclosure is high voltage energy source and low voltage energy source are integrated using a single transformer in such a way that when the ignition pulse is applied it produces series of pulses which are used to switch the switching elements in such a way that across the primary short pulses of alternate positive and negative are applied for the required duration using two switches in the push pull configuration. For every short pulse at the beginning using a third switch for a very short time first high voltage is applied to the transformer primary to initiate the spark. The short duration pulses are adding additional energy to the spark. Energy recovery diodes can also provide energy to the high voltage source.

Yet another aspect of the disclosure is high voltage energy source and low voltage energy source are integrated using a single transformer in such a way that when the ignition pulse is applied PWM IC produces series of pulses which are used to switch the switching elements to produce positive and negative sparks at the sparkplug. The negative feedback to the PWMIC maintains the current to the required level.

Yet another aspect of the disclosure is high voltage energy source and low voltage energy source are integrated using a single transformer in such a way that the applied voltage is continuously varied by the feedback mechanism by sensing the primary current to produce the required current waveform in the sparkplug.

In accordance with yet another embodiment of the present disclosure, a method for assembling the ignition system is provided. The method includes providing a high voltage energy source and a low voltage energy source. The method also includes providing a transformer comprising a primary winding to integrate the high voltage energy source and the low voltage energy source via a switching element to generate significant amount of current. The method further includes enabling the high voltage energy source and the low voltage energy source by a discharge circuit for discharging to the transformer in an orderly manner, wherein the discharge circuit is arranged at a predefined position, wherein the high voltage energy source is supplied by the transformer through a secondary winding.

BRIEF DESCRIPTION OF THE DRAWINGS

The disclosure will be described and explained with additional specificity and detail with the accompanying figures in which.

Figure 1:
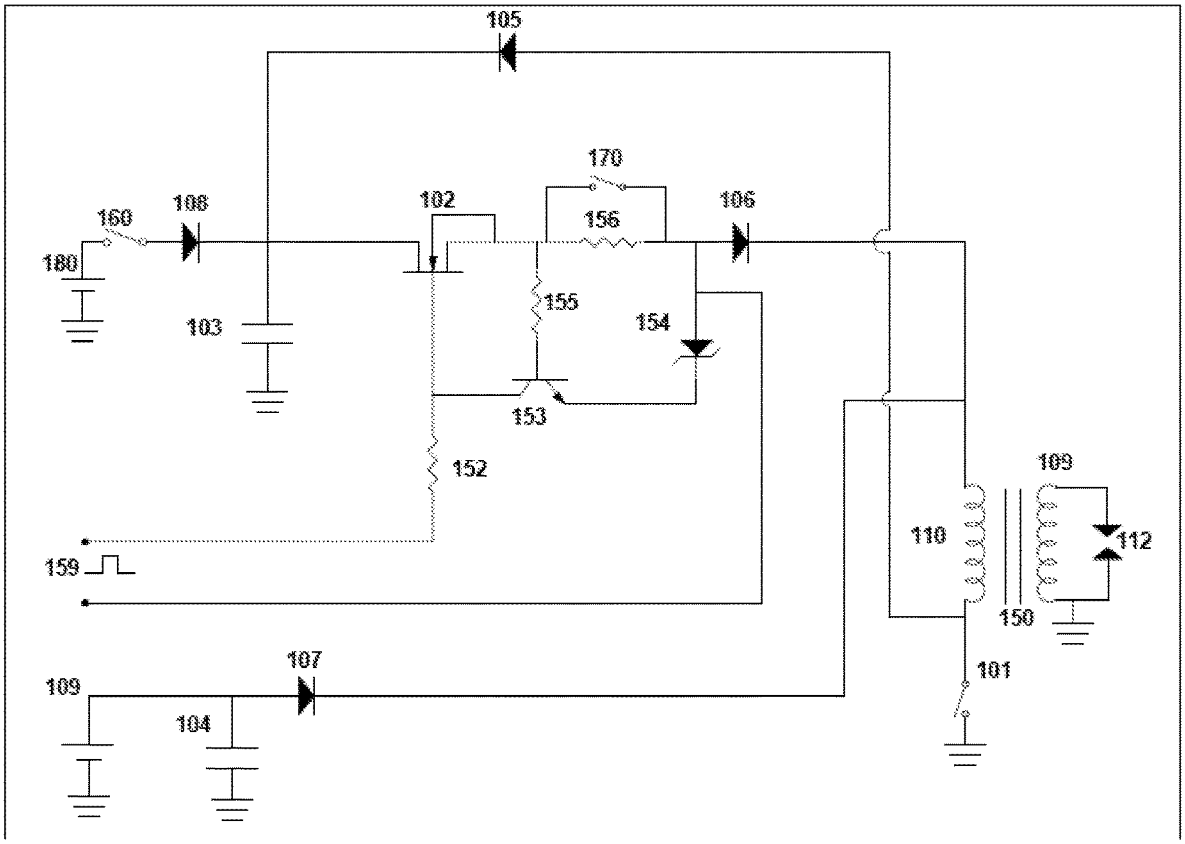
FIG. 1 is a schematic representation of a high energy inductive ignition system using a single primary and two switching elements in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to an ignition system and a method thereof. The ignition system with dual energy source includes a high voltage energy source and a low voltage energy source. The system includes a transformer comprising a primary winding configured to integrate the high voltage energy source and the low voltage energy source via a switching element to generate significant amount of current. The system includes a discharge circuit arranged at a predefined position to enable the high voltage energy source and the low voltage energy source for discharging to the transformer in an orderly manner, wherein the high voltage energy source is supplied by the transformer through a secondary winding.

FIG. 1 is a schematic representation of a high energy inductive ignition system 10 using a single primary and two switching elements in accordance with an embodiment of the present disclosure. The positive input of a DC source 180 is connected to one end of the switch 160. The other end of the switch 160 is connected to anode of the diode 108 and the cathode of the diode 108 is connected to one end of the capacitor 103. The other end of the capacitor 103 is grounded. The negative of the source 180 is grounded. The cathode of the diode 108 is also connected to cathode of the diode 105. The cathode of the diode 108 is also connected to one end of the switch 102. The other end of the switch 102 is connected to one end of the resistor 156 and the other end of the switch 170 is connected to anode of the diode 106. The other end of the resistor 156 is also connected to anode of the diode 106. To the gate of the switch 102 the collector of the transistor 153 is connected. The emitter of the transistor 153 is connected to cathode of the Zener diode 154. The anode of the zenor 154 is connected to anode of the diode 106. The base of the transistor 153 is connected to one end of the resistor 155. The other end of the resistor 155 is connected to source end of the switch 102. The other end of the resistor 152 is connected to one end of the pulse source 159. To the collector of the transistor 153 one end of the resistor 152 is connected. The other end of the pulse source 159 is connected to anode of the diode 106. The cathode of the diode 106 is connected to one end of the primary winding 110 of the transformer 150. The other end of the said primary winding 110 is connected to one end of the switch 101. The other end of the switch 101 is grounded. The ungrounded end of the switch 101 is also connected to anode of the diode 105 The cathode of the diode 106 is also connected to cathode of the diode 107. The anode of the diode 107 is connected to one end of the capacitor 104. The other end of the capacitor 104 is grounded. The anode of the diode 107 is also connected to positive of the DC input source 109. The negative of the source 109 is grounded. One end of the secondary 109 of the transformer 150 is connected to the sparkplug 112. The other end of the sparkplug 112 is grounded. The other end of the secondary 109 is grounded.

Furthermore, using a single transformer and two switches high energy is transferred to the sparkplug 112. In this when the switch 160 is turned on the capacitor 103 receives energy from the source 180 and receives no energy from the source 110 when it is turned off. The circuit can be operated either with switch 160 is on or switch 160 is off. Both mode-1 and mode-2 can be operated either with switch 160 on or off. The primary coil 110 has a lesser number of turns and the secondary coil 109 consists of large number of turns. First, the switches 101, 170 and 102 are turned on together. This makes the current flow through the primary 110 through the switch 102 and 101 from the high voltage source 103. The current that is flowing through the primary 110 induces high voltage in the secondary 109 and initiates the spark in the sparkplug 112. After a very short time the switch 102 is turned off. Now the low voltage source 104, delivers voltage to the primary 110 through the switch 101 through the diode 107. This voltage induces low voltage in the secondary 109 to add additional current to the sparkplug 112. After pre-determined time, the switch 101 is turned off. Now the stored energy in the primary 110 is returned to the capacitor 103 through the diode 105. The capacitor 103 is charged through the diode 108 from the source 110. The capacitor 104 is charged from the low voltage source 109. In case when the switch 102 and switch 101 are turned on and the switch 170 turned off, the circuit operates as a mode-2 in a current controlled manner than what is described above called as mode-1. In this, current through the switch 102 flows through the resistor 156 and through the switch 101. This current develops voltage across the resistor 156. If this voltage across the resistor 156 exceeds the breakdown voltage of the zenor diode 154 plus base emitter voltage of the transistor 153, the transistor 153 conducts, and this reduces the voltage at the gate of the switch 102 due to the current in the collector of the transistor 153. This reduction in gate voltage of the switch 102 reduces the voltage applied to the primary 110 of the transformer. This in turn reduces the voltage in the secondary 109 of the transformer and hence the current through the sparkplug 112. This way the maximum current that is through the sparkplug 112 due to the spark initiating current through the switch 102 is limited. If the switch 170 is closed, then the current through the sparkplug 112 is limited only by the resistance and leakage inductance of the secondary 109 of the transformer in addition to any resistance that is present in the sparkplug 112 or the like.

Figure 2:
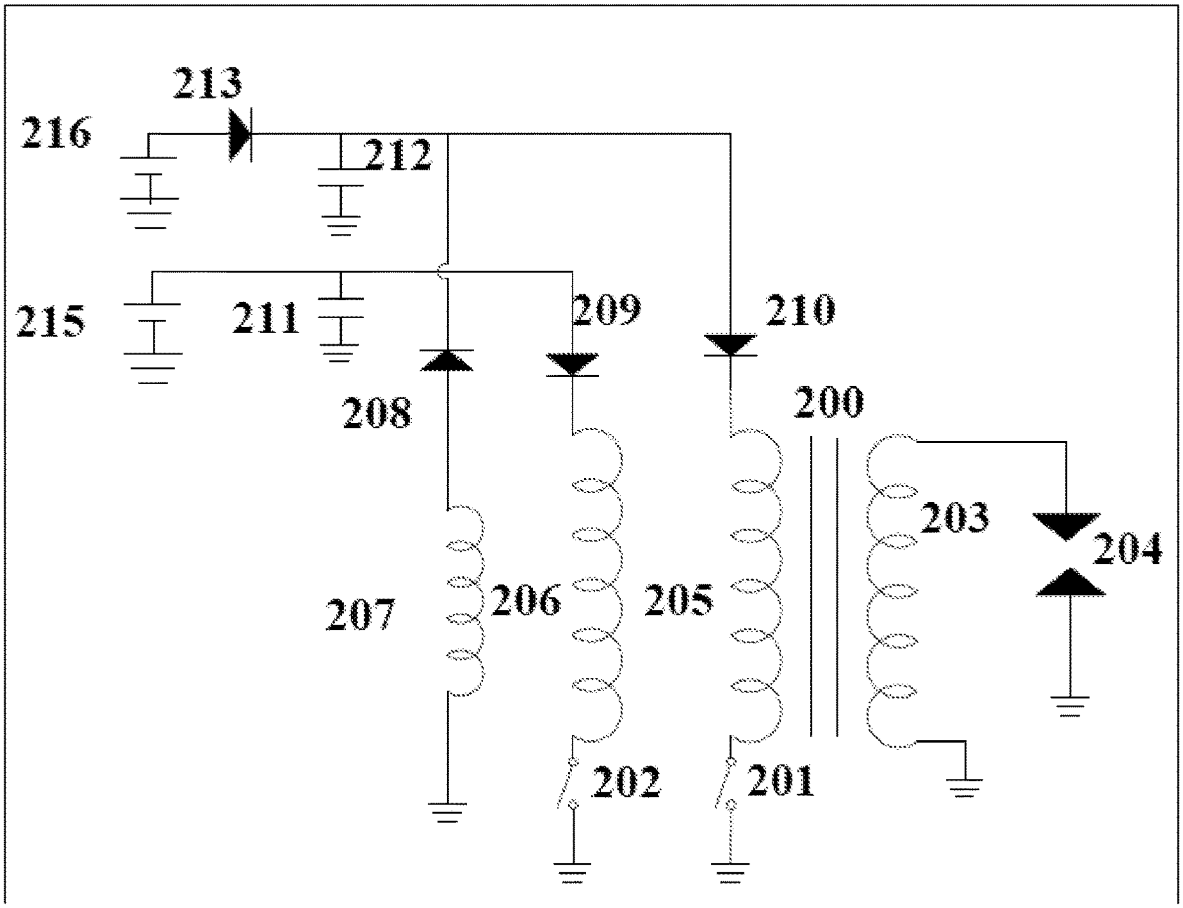
FIG. 2 is a schematic representation of the high energy inductive ignition system with two primary windings and two switching elements in accordance with an embodiment of the present disclosure.

FIG. 2 is a schematic representation of the high energy inductive ignition system with two primary windings and two switching elements in accordance with an embodiment of the present disclosure. The positive terminal of the source 216 is connected to anode of the diode 213. The negative terminal of the source 216 is grounded. The cathode of the diode 213 is connected to one end of the capacitor 212. The other end of the capacitor 212 is grounded. The cathode of the diode 213 also connected to anode of the diode 210. The cathode of the diode 210 is connected to one end of the winding 205 of the transformer 200. The other end of the winding 205 is connected to one end of the switch 201. The other end of the switch 201 is grounded. The positive terminal of the source 215 is connected to one end of the capacitor 211. The other end of the capacitor 211 is grounded. The positive terminal of the source 215 is also connected to anode of the diode 209. The cathode of the diode 209 is connected to one end of the winding 206 of the transformer 200. The other end of the winding 206 is connected to one end of the switch 202. The other end of the switch 202 is grounded. One end of the winding 207 is grounded, and other end of the winding 207 is connected to anode of the diode 208. The cathode of the diode 208 is connected to cathode of the diode 213. One end of the winding 203 of the transformer 200 is grounded and the other end of the winding 203 is connected to one end of the sparkplug 204. The other end of the sparkplug 204 is grounded.

Moreover, the switching elements 201, 202 are turned on together. This makes current to flow through the winding 205 through the diode 210 from the capacitor 212. This capacitor 212 is charged by the voltage source 216. The current flowing through the winding 205 induces high voltage in the secondary winding 203 and initiates the spark in the sparkplug 204. During this time no current flows through the winding 206 due to the reverse bias action of the diode 209. This is because total number of turns in 206 and 207 are adjusted accordingly. After very short time the switch 201 is turned off. Shortly after that the reverse bias voltage of the diode 209 disappears. Now the current flows through the winding 206 through the diode 209. The source 215 charges the capacitor 211. The current flowing through the winding 206 adds additional current to the spark in the sparkplug 204 through the winding 203. After pre-determined time the switch 202 also turned off. Now the stored energy in the primary 206 is returned to the source 212 through the winding 207 and the diode 208.

Figure 3:
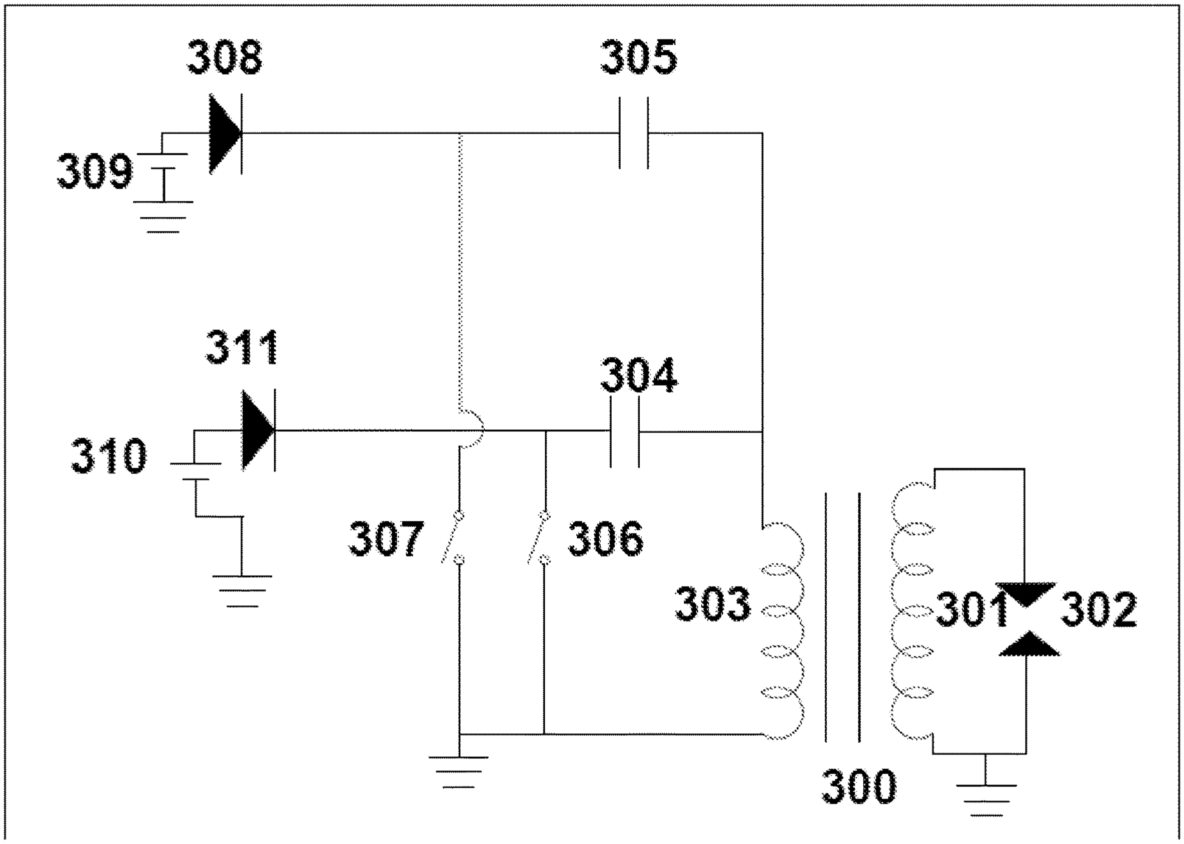
FIG. 3 is a schematic representation of the high energy capacitive ignition system with single primary and two switching elements in accordance with an embodiment of the present disclosure.

FIG. 3 is a schematic representation of the high energy capacitive ignition system with single primary and two switching elements in accordance with an embodiment of the present disclosure. The positive terminal of the source 309 is connected to anode of the diode 308. The negative terminal of the source 309 is grounded. The cathode of the diode 308 is connected to one end of the switch 307. The other end of the switch 307 is grounded. The cathode of the diode 308 is connected to one end of the capacitor 305 also. The other end of the capacitor 305 is connected to one end of the winding 303 of the transformer 300. The other end of the winding 303 is grounded. The positive terminal of the source 310 is connected to anode of the diode 311. The negative terminal of the source 310 is grounded. The cathode of the diode 311 is connected to one end of the capacitor 304. The other end of the capacitor 304 is connected to ungrounded end of the winding 303 of the transformer 300. The cathode of the diode 311 is also connected to one end of the switch 306 and the other end of the switch 306 is grounded. One end of the winding 301 of the transformer 300 is connected to ground. The other end of the winding 301 is connected to one end of the sparkplug 302. The other end of the sparkplug 302 is grounded.

Subsequently, the primary coil 303 has lesser number of turns and the secondary coil 301 consists of large number of turns. First, the capacitors 304 and 305 are charged through the diodes 311 and 308 using the source 310 and 309 respectively. The voltage sources 309 and 310 are short circuit protected and delivers negligible current at short circuit. Then the switches 306 and 307 are switched on together. The voltage across capacitor 304 is higher than the voltage across the capacitor 305. So, the switch 306 conducts, and the switch 307 is reverse biased. Hence, large voltage appears across the winding 303 and this induces high voltage in the secondary 301 of the transformer 300. This initiates the spark in the sparkplug 302. However, as soon as the voltage across the capacitor 304 drops below the voltage level of capacitor 305, the switch 307 conducts and applies voltage across the primary 303 of the transformer 300. This induces voltage in the secondary winding 301 and adds additional energy to the spark in the sparkplug 302.

Figure 4:
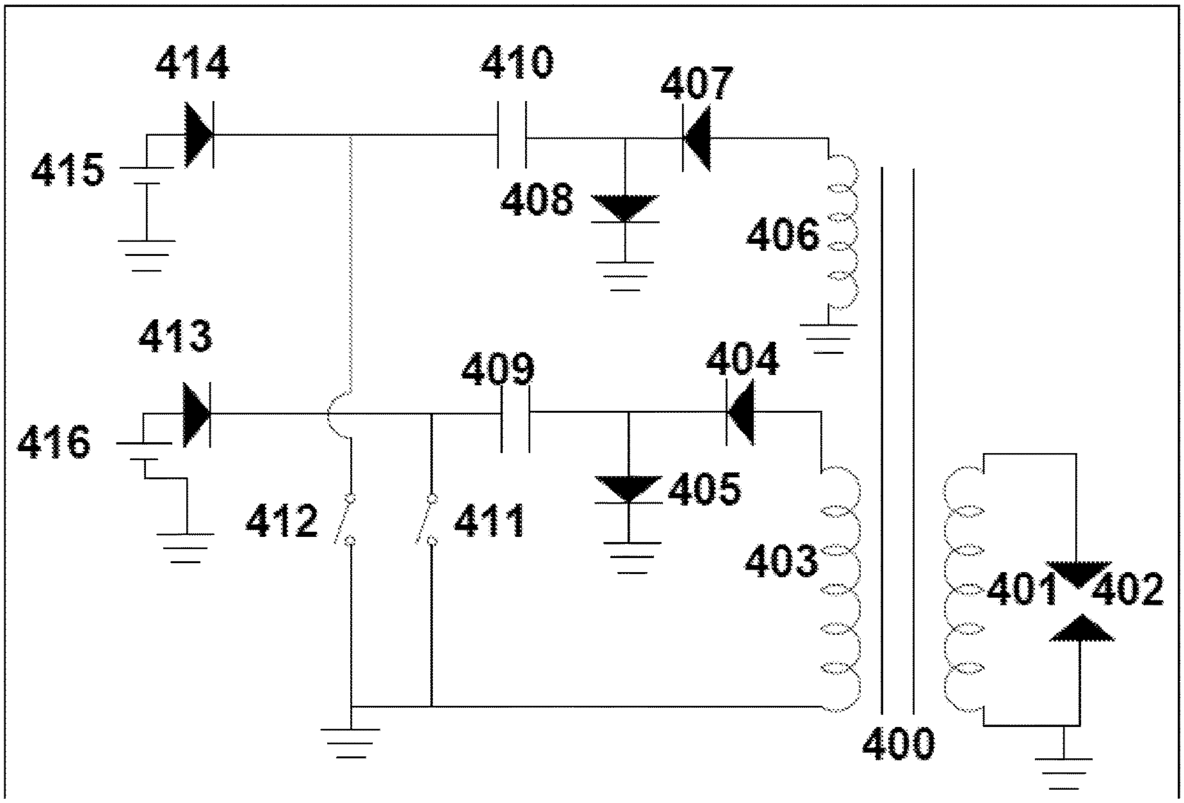
FIG. 4 is a schematic representation of the high energy capacitive ignition system with two primary windings and two switching elements in accordance with an embodiment of the present disclosure.

FIG. 4 is a schematic representation of the high energy capacitive ignition system with two primary windings and two switching elements in accordance with an embodiment of the present disclosure. The positive terminal of the source 415 is connected to anode of the diode 414. The cathode of the diode 414 is connected to one end of the switch 412. The other end of the switch 412 is grounded. The cathode of the diode 414 is connected to one end of the capacitor 410. The other end of the capacitor 410 is connected to anode of the diode 408 and to the cathode of the diode 407. The other end of the diode 408 is grounded. The anode of the diode 407 is connected to one end of the winding 406 of the transformer 400. The other end of the winding 406 is grounded. The positive terminal of the DC source 416 is connected to anode of the diode 413 and cathode of the diode 413 is connected to one end of the switch 411. The other end of the switch 411 is grounded. The cathode of the diode 413 is also connected to one end of the capacitor 409 and the other end of the capacitor 409 is connected to anode of the diode 405 and to the cathode of the diode 404. The cathode of the diode 405 is grounded. The anode of the diode 404 is connected to one end of the winding 403. The other end of the winding 403 of the transformer 400 is grounded. One end of the winding 401 of the transformer 400 is grounded. The other end of the winding 401 is connected to one end of the sparkplug 402. The other end of the sparkplug 402 is grounded.

Furthermore, using a single transformer 400 and two switches, high energy is transferred to the sparkplug 402. The primary coil 403 has lesser number of turns and the secondary coil 401 consists of large number of turns. First the capacitors 409, 410 are charged through the diodes 413 and 405 using the source 416. Similarly, the capacitor 410 is charged through the diodes 408 and 414 using the source 415. The two switches 411 and 412 are switched on together. The first primary 403 has lesser number of turns compared to the second primary 406 of the transformer 400. So initially only the switch 411 alone conducts and applies voltage to the primary 403. This is because the diode 407 is reverse biased, and the diode 404 is forward biased. This induces high voltage in the secondary 401 of the transformer 400 and produces spark in the sparkplug 402. After some time when the voltage across the capacitor 409 comes down, the diode 407 is forward biased and the switch 412 conducts. This applies voltage across the winding 406 of the transformer 400. This voltage across 406 induces lower voltage in the secondary 401 and adds current to the spark across the sparkplug 402.

Figure 5:
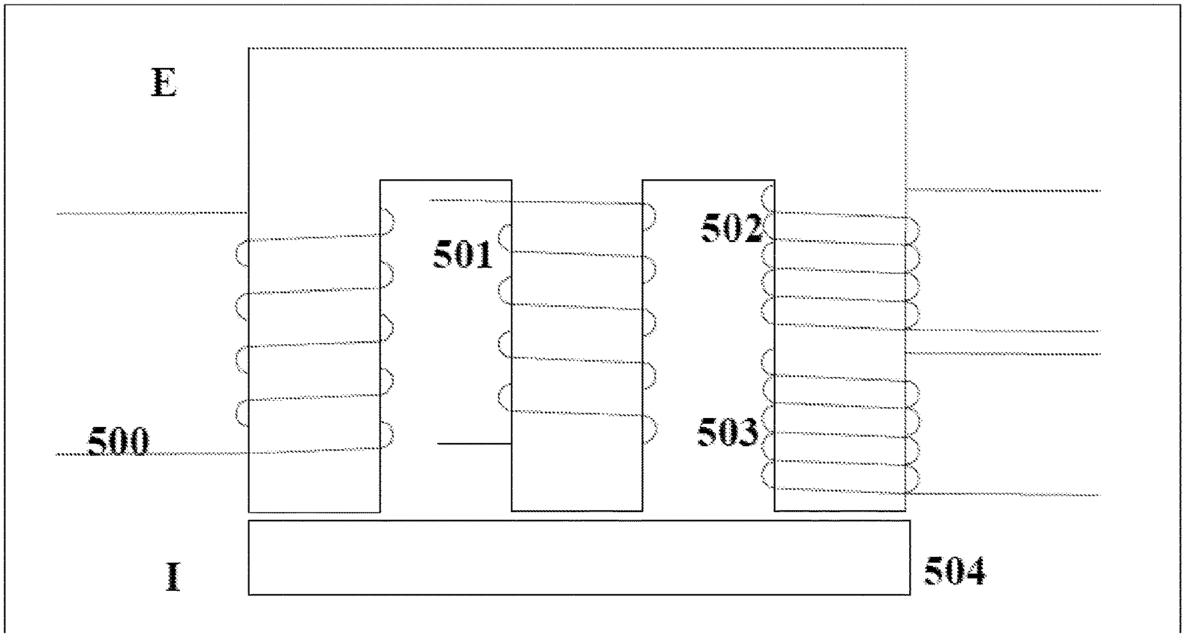
FIG. 5 is a schematic representation of the transformer winding details of the high energy ignition system with two primary windings in which spark initiating winding is wound non-interactively with another primary winding in accordance with an embodiment of the present disclosure.
Figure 6:
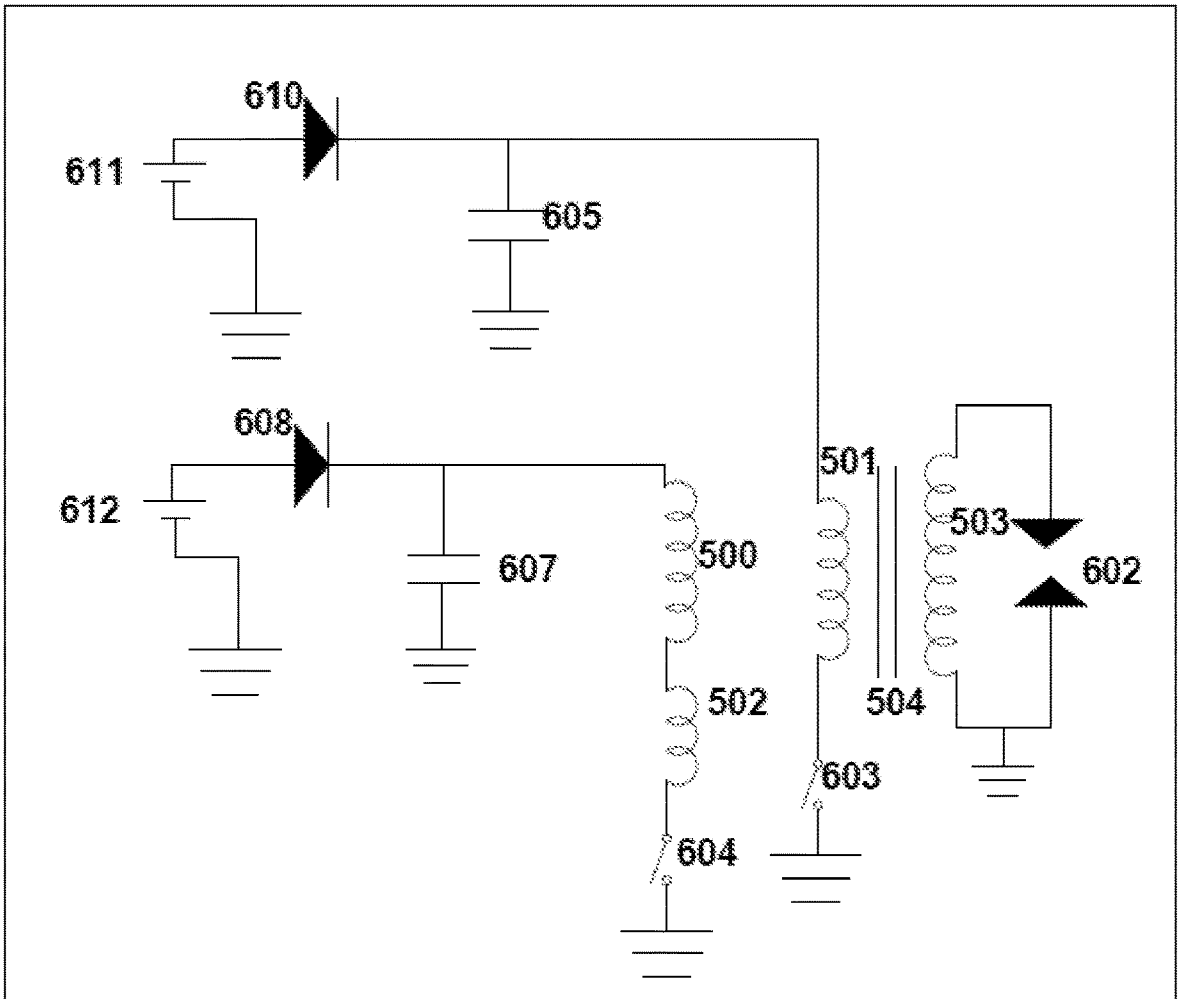
FIG. 6 is a schematic representation of the high energy inductive ignition system with two switching elements and non-interactively wound dual primary transformer in accordance with an embodiment of the present disclosure.
Figure 7:
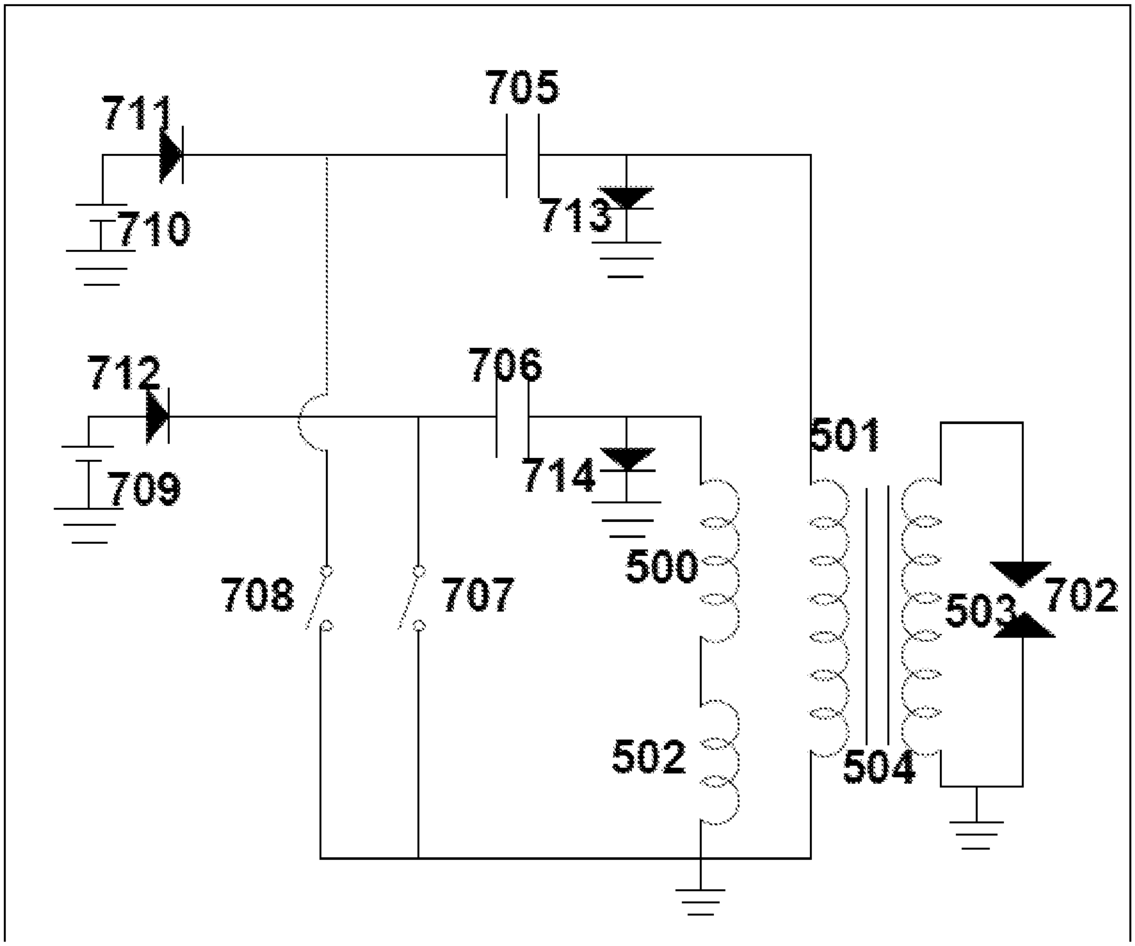
FIG. 7 is a schematic representation of the high energy capacitive ignition system with two switching elements and non-interactively wound dual primary transformer in accordance with an embodiment of the present disclosure.

FIG. 5 is a schematic representation of the transformer winding details that are used in the new configurations as detailed in FIG. 6 and FIG. 7 in accordance with an embodiment of the present disclosure. In this, the coil 501 is wound in the centre leg of the transformer core 504. The winding 500 is wound on the one of the outer legs of the core. To the other outer leg, the winding 502 is wound. To the same leg, high voltage winding 503 is also wound. The windings 500 and 502 are equal, and series connected in such a way that the magnetic flux generated by them will not flow through the center leg of the transformer 504.

In FIG. 6, the positive terminal of the DC source 611 is connected to anode of the diode 610. The negative terminal of the source 611 is grounded. The cathode of the diode 610 is connected to one end of the capacitor 605. The other end of the capacitor 605 is grounded. The cathode of the diode 610 is also connected to one end of the winding 501 of the transformer 504. The other end of the winding 501 is connected to one end of the switch 603. The other end of the switch 603 is grounded. The positive terminal of the DC source 612 is connected to anode of the diode 608. The negative terminal of the DC source 612 is grounded. The cathode of the diode 608 is connected to one end of the capacitor 607. The other end of the capacitor 607 is grounded. The cathode of the diode 608 is connected to one end of the winding 500. The other end of the winding 500 is connected to one end of the winding 502. The other end of the winding 502 is connected to one end of the switch 604. The other end of the switch 604 is grounded. One end of the winding 503 of the transformer 504 is grounded. The other end of the said winding 503 is connected to one end of the sparkplug 602. The other end of the sparkplug 602 is grounded.

FIG. 6 illustrates yet another configuration for the high energy ignition system. Here, the transformer 504 is operatively connected to the circuit in FIG. 6. The switch 604 is turned on. This allows the current from the capacitor 607 to flow through the series connected windings 500 and 502 of the transformer 504. This capacitor 607 is charged from the source 612 through the diode 608. The current flowing through the windings 500 and 502 induces high voltage in the secondary winding 503. But it induces no voltage in the winding 501. This high voltage generates spark in the sparkplug 602. After a short interval the switch 603 is turned on and switch 604 is turned off. This allows the current to flow through the winding 501 and shuts down the current in the windings 500 and 502. The current in the winding 501 is supplied by the capacitor 605. The capacitor 605 is charged from the source 611 through the diode 610. The current flowing through the winding 501 induces voltage in the secondary 503 and adds current to the spark in the sparkplug 602. The sources 611 and 612 are short circuit protected and give negligible current during short circuit.

FIG. 7 is a schematic representation of the high energy capacitive ignition system with two switching elements and non-interactively wound dual primary transformer in accordance with an embodiment of the present disclosure. The positive terminal of the DC source 710 is connected to anode of the diode 711. The negative terminal of the said source 710 is grounded. The cathode of the diode 711 is connected to one end of the switch 708. The other end of the switch 708 is grounded. The cathode of the diode 711 is also connected to one end of the capacitor 705. The other end of the capacitor 705 is connected to anode of the diode 713. The cathode of the diode 713 is grounded. The anode of the diode 713 is also connected to one end of the winding 501 of the transformer 504. The other end of the winding 501 is grounded. The positive terminal of the source 709 is connected to anode of the diode 712. The negative terminal of the said DC source is grounded. The cathode of the diode 712 is connected to one end of the switch 707. The other end of the switch 707 is grounded. The cathode of the diode 712 is also connected to one end of the capacitor 706. The other end of the capacitor 706 is connected to anode of the diode 714. The cathode of the diode 714 is grounded. The anode of the diode 714 is connected to one end of the winding 500 of the transformer 504. The other end of the said winding 500 is connected to one end of the winding 502 and other end of the winding 502 is grounded. One end of the winding 503 of the transformer 504 is grounded. The other end of the winding 503 is connected to one end of the sparkplug 702. The other end of the sparkplug 702 is grounded.

FIG. 7 shows yet another configuration for the high energy ignition system. Here, the transformer 504 is operatively connected to the circuit in FIG. 7. The capacitor 706 is charged through the diodes 712 and 714 using the source 709. At the same time, the capacitor 705 is charged through the diodes 713 and 711 using the source 710. Now the switch 707 is turned on. This makes the capacitor 706 to discharge through the series connected windings 500 and 502. This induces no voltage in the winding 501. But this induces high voltage in the secondary winding 503. This voltage in the winding 503, initiates spark in the sparkplug 702. After pre-determined time, the switch 708 is turned on. This forces the capacitor 705 to discharge through the winding 501. This current in the winding 501 induces voltage in the secondary 503. This intern adds current in the already existing spark in the sparkplug 702. Once the capacitors 706 and 705 fully discharged the switches 707 and 708 may be turned off.

Figure 8:
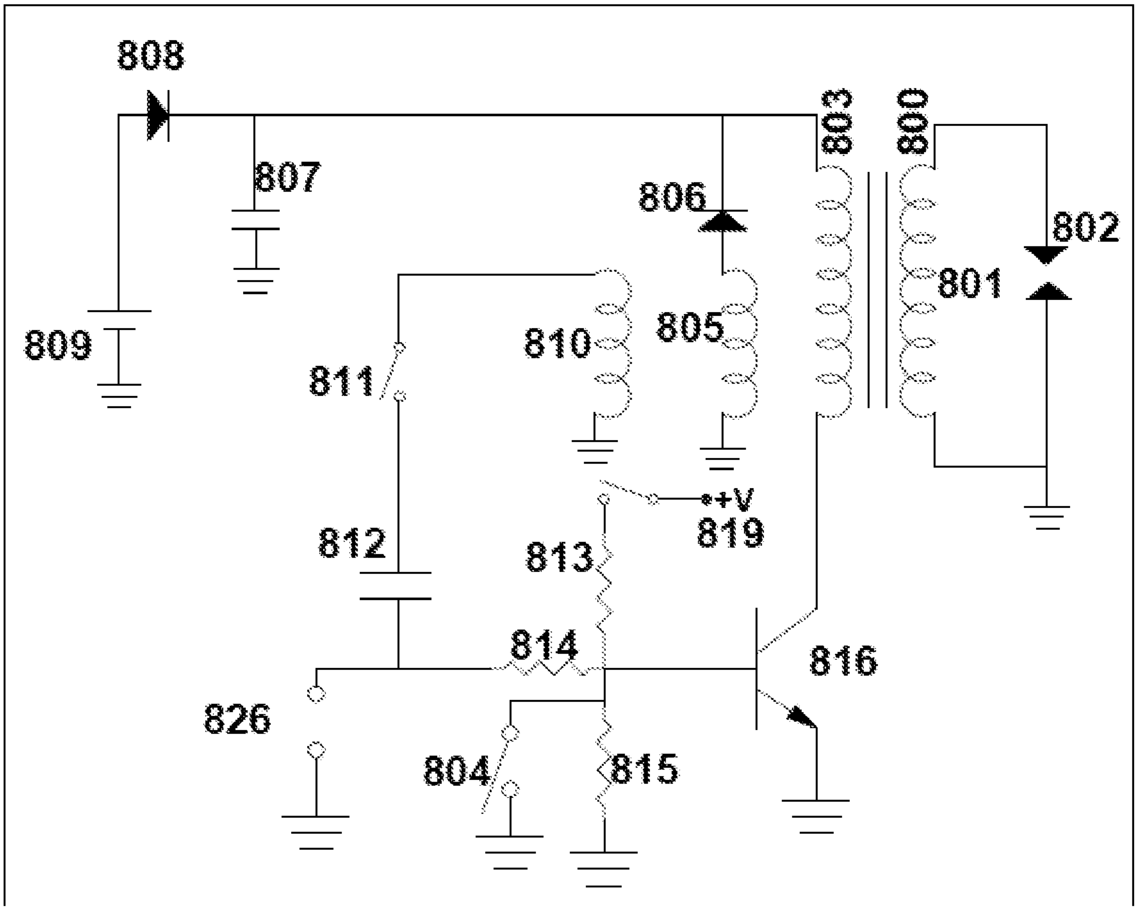
FIG. 8 is a schematic representation of the high energy inductive ignition system with one switching element and one source in accordance with an embodiment of the present disclosure.

FIG. 8 is a schematic representation of the high energy inductive ignition system with one switching element and one source in accordance with an embodiment of the present disclosure. The positive terminal of the DC source 809 is connected to anode of the diode 808. The negative terminal of the source 809 is grounded. The cathode of the diode 808 is connected to one end of the capacitor 807. The other end of the capacitor 807 is grounded. The cathode of the diode 808 is also connected to one end of the winding 803 of the transformer 800. The other end of the winding 803 is connected to one end of the control element 816. The other end of the control element 816 is grounded. The cathode of the diode 808 is also connected to cathode of the diode 806. The anode of the diode 806 is connected to one end of the winding 805 of the transformer 800. The other end of the said winding 805 is grounded. One end of the winding 801 of the transformer 800 is grounded. The other end of the winding 801 is connected one end of the sparkplug 802. The other end of the sparkplug 802 is grounded. One end of the winding 810 of the transformer 800 is connected to one end of the switch 811 and the other end of the winding 810 is grounded. The other end of the switch 811 is connected to one end of the capacitor 812. The other end of the capacitor 812 is connected to one end of the resistor 814 and also to one end of the pulse source 826. The other end of the pulse source 826 is grounded. The other end of the resistor 814 is connected to control terminal of the control element 816. One end of the resistor 813 is connected to one end of the switch 819 and other end of the switch 819 is connected to bias voltage +V. The other end of the resistor 813 is connected to control terminal of the control element 816. One end of the resistor 815 is connected to control terminal of the control element 816. The other end of the resistor 815 is grounded. One end of the switch 804 is connected to control terminal of the control element 816. The other end of the switch 804 is grounded.

FIG. 8 shows yet another configuration for the high energy ignition system. This can be operated in two modes. In mode-1, the switches 811, 819 and 804 are open. Here, the control element 816 is turned on by applying the pulse from the pulse source 826. This allows the current from the capacitor 807 flow through the winding 803 of the transformer 800. The capacitor 807 is charged to a high voltage through the diode 806 by the winding 805 when 816 is turned off in the previous cycle. The current through the winding 803 induces high voltage in the secondary 801 of the transformer 800. This high voltage initiates the spark in the sparkplug 802. Initially voltage across the capacitor 807 is higher than the supply voltage 809. So, the diode 808 is reverse biased and hence no current flows through the diode 808. Once the control element 816 is on, the voltage across the capacitor 807 slowly comes down. Now, the diode 808 conducts and supplies energy to the winding 803. However, this voltage is low, and hence only low induced voltage is generated in the winding 801. However, this adds additional current to the already existing spark in the sparkplug 802. After pre-determined time, the control element 816 is turned off. Now the stored energy in the primary is delivered to the capacitor 807 through the diode 806 by the winding 805.

In one embodiment, the circuit in FIG. 8 may be operated in another mode. In this mode-2, the switches 811, 819 are switched on and the switch 804 is kept open. No pulse is applied from the pulse terminal 826 and it is kept open. This allows the current flow through the winding 803 due to the bias current supplied through the resistor 813 from the V+ source. This induces positive voltage in the winding 810 at the ungrounded end of the terminal. During this time the diode 806 is reverse biased. This makes the current flow through the capacitor 812, resistor 814 and to the control terminal of the control element 816. This said current increases the current through the winding 803. This in turn increases the voltage induced in the winding 810 and hence further increase in current to the control terminal of the control element 816. This positive feedback continuously increases the current through the winding 803. During this time voltage is induced in the winding 801 and these initiates spark in the sparkplug 802 However, after some time the core of the transformer 800 enters into saturation and this makes the voltage across the winding 810 to decrease. This in turn reduces the current through the control terminal of the control element 816. This further reduces the current in the winding 803. During this phase also voltage is induced the winding 801 and this makes the current to flow through the sparkplug 802. During this time the diode 806 also forward biased and the high induced voltage in the winding 805 delivers power to the capacitor 807 through the diode 806.

The reduced voltage in the winding 810 reduces current in the winding 803 further and finally the control element 816 is turned off. Now stored energy in the transformer is delivered to the sparkplug 802 through the winding 801. Part of the stored energy in the transformer 800 also delivered to the capacitor 807 through the diode 806. This increases the voltage across the capacitor 807 much above the source voltage 809. Once the control element is turned off, current started flowing again to the control terminal of the control element 816 from the source v+. This again switches on the control element 816 due to the positive feedback as said above. This induces again spark in the sparkplug 802. Again, as said above once the transformer 800 saturates the control element 816 goes off. This time once again spark is generated in the sparkplug 802. Again, part of the stored energy in the transformer 800 is delivered to the capacitor 807 through the winding 805. This way automatically the control element 816 turned on and off and delivering energy to the sparkplug 802 during the control element 816 on and as well as off. The capacitor 807 value is adjusted so as to deliver high voltage to the winding 803 only for a very short time to initiate the spark and thereafter the source 809 delivers energy to the winding 803 through the diode 808. The power delivered to the sparkplug 802 can be stopped any time by turning on the switch 804.

Figure 9:
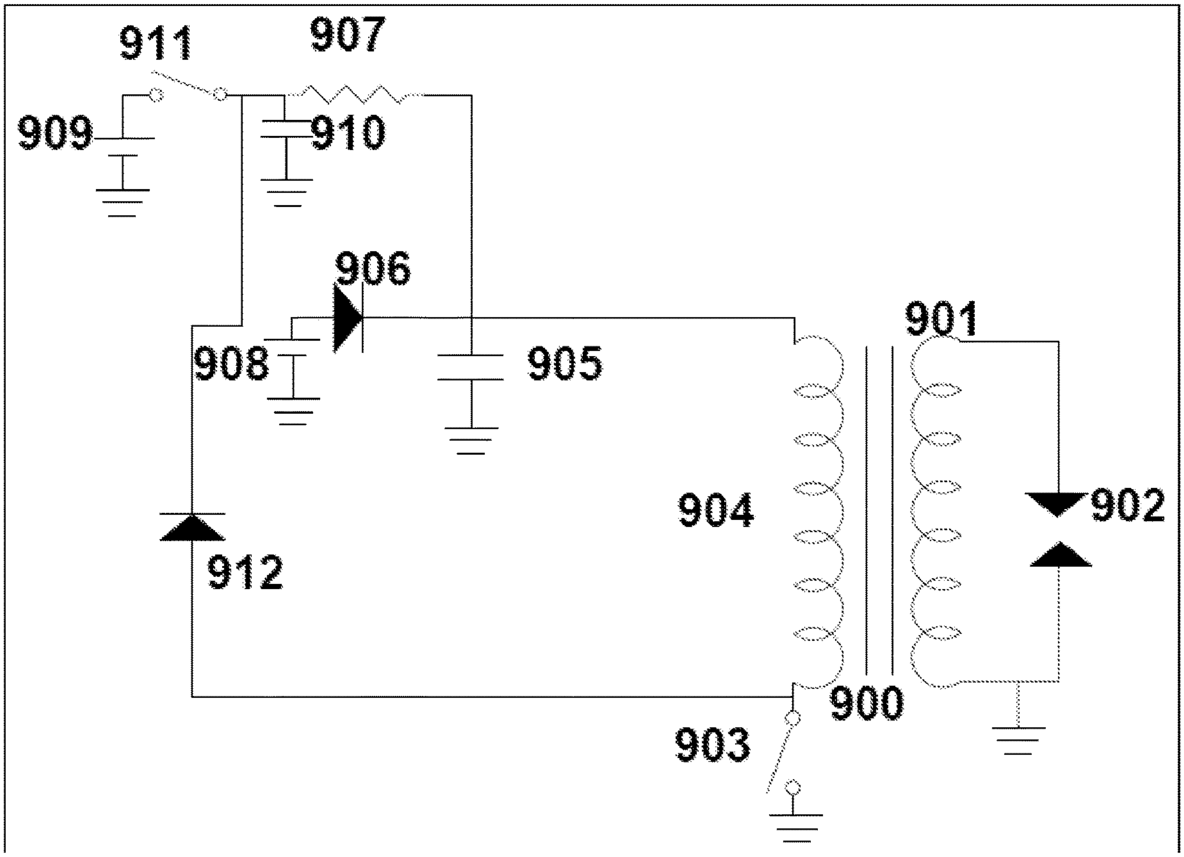
FIG. 9 is a schematic representation of the high energy inductive ignition system with one switching element and with one source which supplies high voltage initially by receiving energy from the high voltage source through a resistance in accordance with an embodiment of the present disclosure.

FIG. 9 is a schematic representation of the high energy inductive ignition system with one switching element and with one source which supplies high voltage initially by receiving energy from the high voltage source through a resistance in accordance with an embodiment of the present disclosure. The positive terminal of the DC source 908 is connected to anode of the diode 906. The negative terminal of the source 908 is grounded. The cathode of the diode 906 is connected to one end of the capacitor 905. The other end of the capacitor 905 is grounded. The positive terminal of the source 909 is connected to one end of the switch 911. The other end of the switch 911 is connected to one end of the capacitor 910. The other end of the capacitor 910 is grounded. The negative terminal of the source 909 is grounded. One end of the resistor 907 is connected to ungrounded end of the capacitor 910. The other end of the resistor 907 is connected to cathode of the diode 906. The cathode of the diode 906 is also connected to one end of the winding 904 of the transformer 900. The other end of the winding 904 is connected to one end of the switch 903. The other end of the switch 903 is grounded. One end of the winding 901 of the transformer 900 is grounded. The other end of the winding 901 is connected to one end of the sparkplug 902. The other end of the sparkplug 902 is grounded. To the ungrounded end of the switch 903 anode of the diode 912 is connected. The cathode of the diode 912 is connected to the ungrounded end of the capacitor 910.

FIG. 9 shows yet another configuration for the high energy ignition system and operated in two modes. In first mode, the switch 911 is switched on and the required energy flows to the capacitor 910 from the source 909. In the second mode the switch 911 is kept open and no energy flows to the capacitor 910 from the source 909. All the other working is common for both the modes. For the operation first the switch 903 is turned on. This allows the current from the capacitor 905 flow through the winding 904 of the transformer 900. The capacitor 905 is charged previously to a high voltage through the resistor 907 from the capacitor 910, when the switch 903 was off. So, as soon as the switch 903 is turned on high voltage is applied to the winding 904 of the transformer 900. This induces high voltage across the winding 901 of the transformer 900. This high voltage initiates the spark in the sparkplug 902. However, as time passes the voltage across the capacitor 905 decreases, because the charging through the resistor is slow and the diode 906 is reverse biased. When the voltage across the capacitor 905 comes below the voltage level of the source 908 the diode 906 conducts and delivers current to the winding 904 from the source 908. Now, low voltage is induced in the secondary 901 of the transformer 900. This adds additional current to the already initiated spark in the sparkplug 902. After pre-determined time, the switch 903 is turned off. The diode 912 delivers stored energy to the capacitor 910 from the primary winding 904 of the transformer 900.

Figure 10:
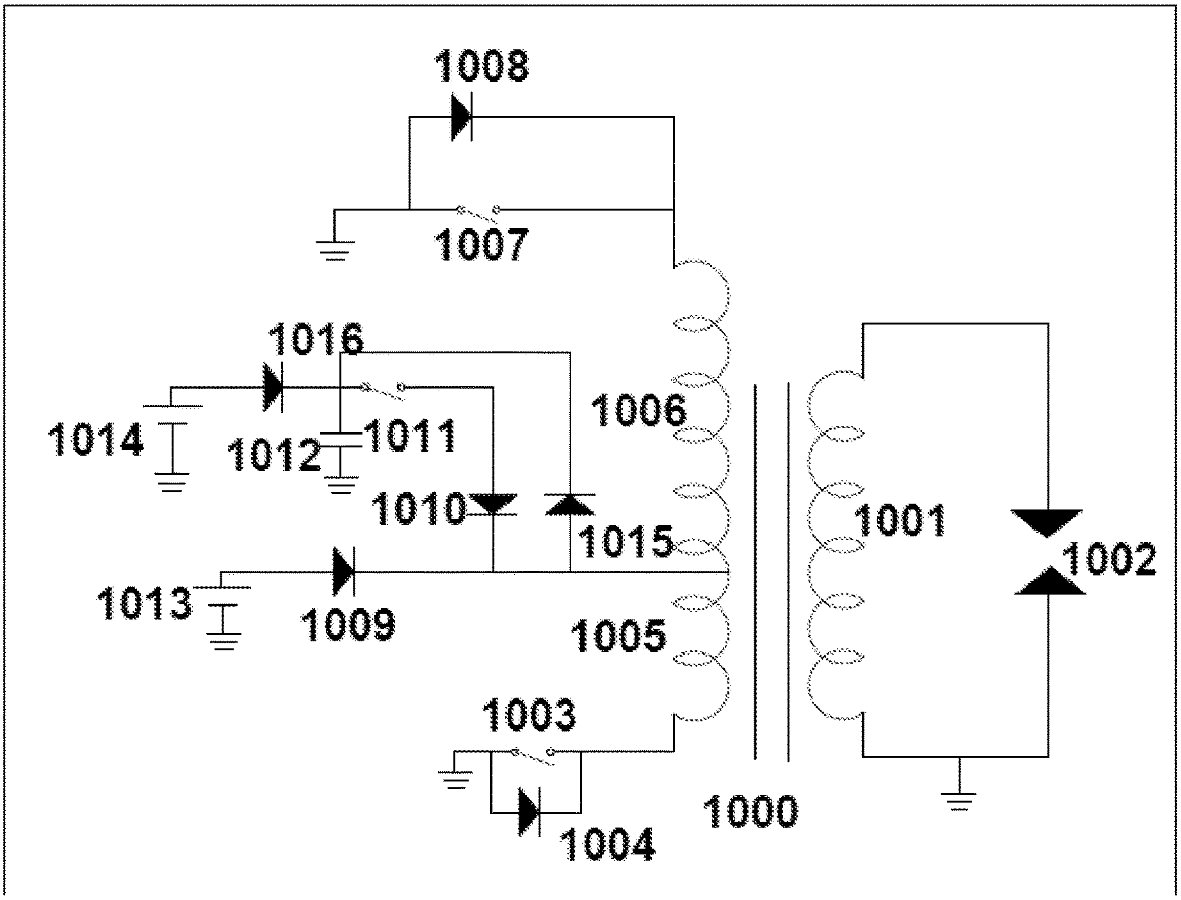
FIG. 10 is a schematic representation of the high energy ignition system with two switching elements and two energy sources which delivers series of pulses to the spark through push-pull transformer in accordance with an embodiment of the present disclosure.

FIG. 10 is a schematic representation of the high energy ignition system with two switching elements and two energy sources which delivers series of pulses to the spark through push-pull transformer in accordance with an embodiment of the present disclosure. The positive terminal of the DC source 1014 is connected to anode of the diode 1016. The cathode of the diode 1016 is connected to one end of the capacitor 1012 and to one end of the switch 1011. The other end of the switch 1011 is connected to anode of the diode 1110. The negative terminal of the source 1014 is connected to ground. The other end of the capacitor 1012 is grounded. The cathode of the diode 1015 is also connected to cathode of the diode 1016. The cathode of the diode 1010 is connected to the centre tap of the winding 1005 and 1006 of the transformer 1000. The positive terminal of the DC source 1013 is connected to anode of the diode 1009. The cathode of the diode 1009 is connected to cathode of the diode 1010. The anode of the diode 1015 is connected to cathode of the diode 1009. The outer terminal of the winding 1005 of the transformer is connected to one end of the switch 1003. The other end of the switch 1003 is grounded. The anode of the diode 1004 is grounded. The cathode of the diode 1004 is connected to ungrounded end of the switch 1003. The outer end of the winding 1006 is connected to one end of the switch 1007. The other end of the switch 1007 is grounded. The anode of the diode 1008 is grounded. The cathode of the diode is connected to ungrounded end of the switch 1007. One end of the winding 1001 of the transformer 1000 is grounded. The other end of the winding 1001 is connected to one end of the sparkplug 1002. The other end of the sparkplug 1002 is grounded.

FIG. 10 shows yet another configuration for the high energy ignition system. Here, the switch 1007 is turned on along with switch 1011. This delivers high voltage to the winding 1006 through the diode 1010 from the capacitor 1012. This capacitor is initially charged through diode 1016 from the source 1014. The current flowing through the winding 1006 induces voltage in the secondary winding 1001 of the transformer 1000. This high voltage initiates spark in the sparkplug 1002. After a short time, the switch 1011 is turned off. Now the current is delivered to the winding 1006 through the diode 1009 by the source 1013. This delivers additional energy to the sparkplug 1002 through the secondary winding 1001. After a pre-determined time, the switch 1007 is turned off. Now the stored energy in the winding 1006 is delivered to the high voltage capacitor 1012 through the diodes 1004 and 1015. Once the switch 1007 is turned off within very small time the switches 1003 and 1011 are turned on. Now, the current flows through the winding 1005 and initiates spark in the sparkplug 1002 through the winding 1001. Again, after brief time the switch 1011 alone turned off. Now, energy to the winding 1005 is provided by the source 1013 through the diode 1009. This adds additional energy to the spark at the sparkplug 1002 through the secondary winding 1001. After some time, the switch 1003 is turned off. Now the stored energy in the winding 1005 is returned to the high voltage capacitor 1012 through the diodes 1008 and 1015. This switching cycle is repeated between the switches 1007 and 1003 for the required number of times.

Figure 11:
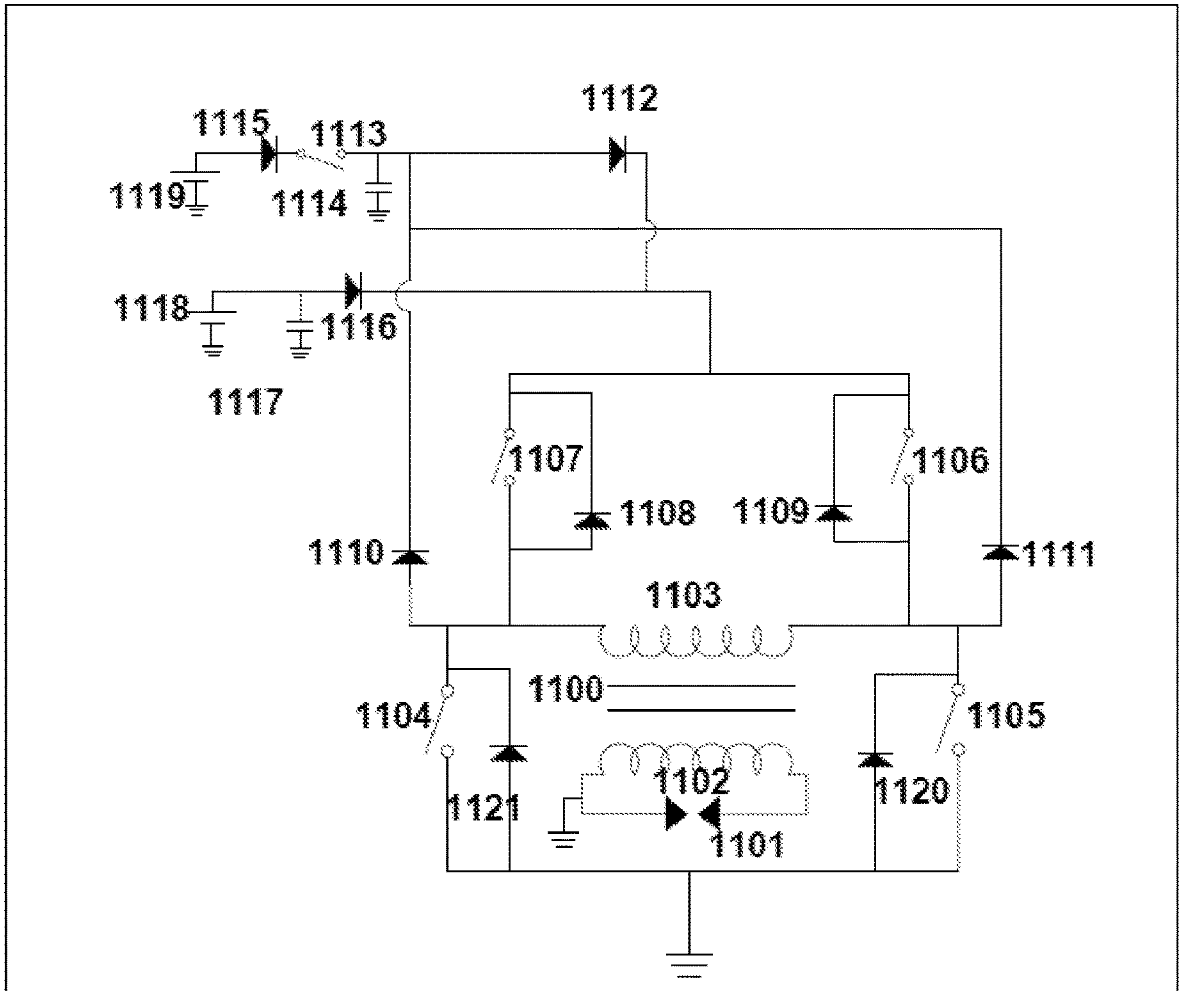
FIG. 11 is a schematic representation of the high energy ignition system with four switching elements and two energy sources which delivers series of pulses to the spark through bridge configuration in accordance with an embodiment of the present disclosure.

FIG. 11 is a schematic representation of the high energy ignition system with four switching elements and two energy sources which delivers series of pulses to the spark through bridge configuration in accordance with an embodiment of the present disclosure. The positive end of the DC source 1118 is connected to anode of the diode 1116. The negative end of the said source 1118 is grounded. The anode of the diode 1116 is also connected to one end of the capacitor 1117. The other end of the capacitor 1117 is grounded. The positive end of the source 1119 is connected to anode of the diode 1115. The negative end of the source 1119 is grounded. The cathode of the diode 1115 is connected to one end of the switch 1113. The other end of the switch 1113 is connected to one end of the capacitor 1114 The negative end of the capacitor 1114 is grounded. The ungrounded end of the capacitor 1114 is connected to anode of the diode 1112. The cathodes of the diodes 1110 and 1111 are connected to anode of the diode 1112. The other end of the switch 1113 is connected to anode of the diode 1112. The cathode of the diode 1112 is connected to cathode of the diode 1116. The cathode of the diode 1116 is also connected to cathode of the diode 1108 and 1109. The cathode of the diode 1116 is also connected to one end of the switch 1107 and to one end of the switch 1106. The other end of the switch 1107 is connected to anode of the diode 1108. The anode of the diode 1108 is also connected to anode of the diode 1110 and cathode of the diode 1121. The anode of the diode 1108 is also connected to one end of the winding 1103 of the transformer 1100. The cathode of the diode 1121 is connected to one end of the switch 1104. The other end of the switch 1104 is grounded. The anode of the diode 1121 is grounded. The other end of the winding 1103 of the transformer 1100 is connected to anode of the diode 1109 and anode of the diode 1111 and cathode of the diode 1120. The cathode of the diode 1120 is also connected to one end of the switch 1105. The other end of the switch 1105 is grounded. The anode of the diode 1120 is grounded. One end of the winding 1102 of the transformer 1100 is grounded. The other end of the winding 1102 is connected to one end of the sparkplug 1101. The other end of the sparkplug 1101 is grounded. The anode of the diode 1121 is grounded.

FIG. 11 shows yet another configuration for the high energy ignition system. In this embodiment, switches 1107, 1113 and 1105 are turned on together. This makes the capacitor 1114 discharge the current to the winding 1103 of the transformer 1100 through the diode 1112. The capacitor 1114 is charged from the source 1119 continuously. The current in the winding 1103 initiates the spark in the sparkplug 1101 through the secondary winding 1102 of the transformer 1100. After a short time, the switch 1113 alone turned off. Now the energy flows through the diode 1116 to the winding 1103 and this intern adds additional energy to the spark at the sparkplug 1101 through the winding 1102. After some time, the switches 1107 and 1105 are turned off. At this time the stored energy in the winding 1103 is returned to the capacitor 1114 through the diodes 1111 and 1121. Next, the switches 1113, 1106 and 1104 are turned on together. This delivers reverse current to the winding 1103. These initiates spark in the sparkplug 1101 through the winding 1102. Shortly, the switch 1113 is turned off. Now, the energy is flowing through the diode 1116 to the winding 1103. This current adds additional energy to the spark at the sparkplug 1101 through the winding 1102. After some time, the switches 1106 and 1104 are turned off. Now, the stored energy in the winding 1103 is returned to the source 1114 through the diode 1110 and 1120. This switching cycle is repeated to the required number of times to increase the spark duration at the sparkplug 1101.

Figure 12:
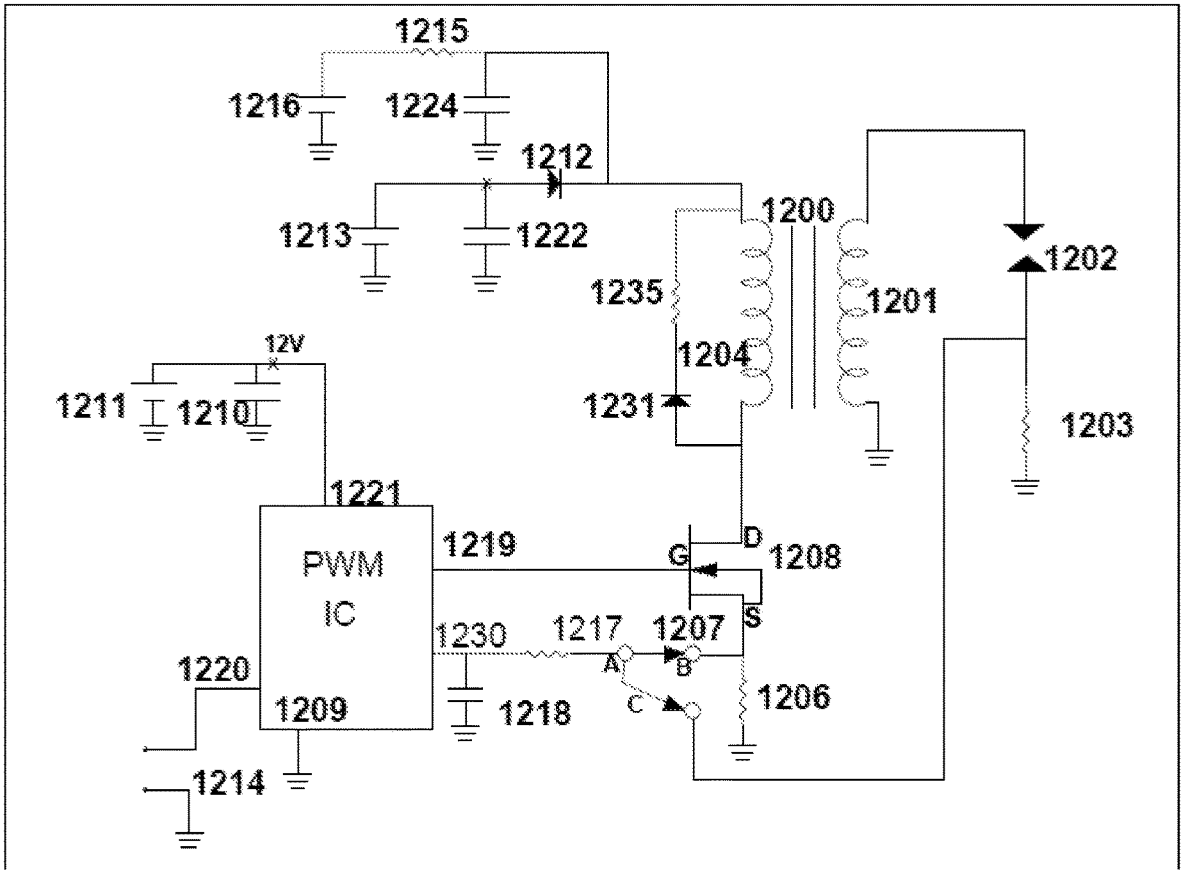
FIG. 12 is a schematic representation of the dual source high energy ignition system with current controlled PWM integrated circuit which produces series of pulses at the sparkplug in accordance with an embodiment of the present disclosure.

FIG. 12 is a schematic representation of the dual source high energy ignition system with current controlled PWM integrated circuit which produces series of pulses at the sparkplug in accordance with an embodiment of the present disclosure. The positive terminal of the source 1213 is connected to anode of the diode 1212. The negative terminal of the source 1213 is grounded. The anode of the diode 1212 is connected to one end of the capacitor 1222. The other end of the capacitor 1224 is grounded. The positive end of the source 1216 is connected to one end of the resistor 1215. The other end of the resistor 1215 is connected to one end of the capacitor 1224 and to the cathode of the diode 1212. The other end of the capacitor 1224 is grounded. The cathode of the diode 1212 is connected to one end of the winding 1204 of the transformer 1200. The other end of the said winding 1204 is connected to drain of the switching device 1208. The source of the said device 1208 is connected to one end of the resistor 1206. The other end of the resistor 1206 is grounded. The anode of the diode 1231 is connected to drain of the device 1208. The cathode of the diode 1231 is connected to one end of the resistor 1235. The other end of the resistor 1235 is connected to cathode of the diode 1212. One end of the winding 1201 of the transformer 1200 is grounded. The other end of the winding 1201 is connected to one end of the sparkplug 1202. The other end of the sparkplug 1202 is connected to one end of the resistor 1203. The other end of the resistor 1203 is grounded. The ungrounded end of the resistor 1206 is also connected to the terminal B of the selector 1207. The ungrounded end of the resistor 1203 is also connected to terminal C of the selector switch 1207. The pole A of the selector switch 1207 is connected to one end of the resistor 1217. The other end of the resistor 1217 is connected to one end of the capacitor 1218 and to the terminal 1230 of the PWM IC 1209. The pulse output terminal 1219 of the PWM IC 1209 is connected to gate of the switching device 1208. The positive power input of the PWM IC is connected to the positive terminal of the DC source 1211 and to one end of the capacitor 1210. The other end of the capacitor 1210 is grounded. The ground terminal of the said PWM IC 1209 is grounded. The shutdown terminal 1220 of the PWM IC is connected to the pulse input terminal of the pulse source 1214. The other terminal of the pulse source 1214 is grounded. The negative terminal of the source 1211 is grounded.

FIG. 12 shows yet another configuration for the high energy ignition system. In this embodiment the PWM IC 1209 produces short high frequency pulses at its output 1219 to the switch 1208 to turn on and off. These pulses are produced as long as input signal 1214 is present at 1220. The frequency of 1209 is much higher than ignition pulses at 1214. When the switch 1208 is turned on it applies high voltage present across the capacitor 1224 to the winding 1204 of the transformer 1200. This induces high voltage in the winding 1201 and initiates the spark in the sparkplug 1202. This allows the current to flow through the resistor 1206. The selector switch 1207 may be used to select depending on the need once for all any one of the signals i.e., B or C. The selected voltage appears at the terminal A. This voltage at terminal A is filtered through the resistance 1217 and capacitor 1218 for any high frequency noise present and applied to the terminal 1230 of the PWM IC. If this voltage at 1217 is higher than set value it terminates the high frequency pulses pre-maturely.

Once pulse is terminated at 1219, the switch 1208 goes off. This again produces spark in the sparkplug 1202 in the reverse direction due to the stored energy in the winding 1201. This capacitor 1224 is charged through the resistor 1215 from the source 1216. The diode 1231 and resistor 1235 discharge the left over charge in the winding 1204 up on switching off of the switch 1208. The PWM IC pulse at 1219 once terminated, it puts next pulse after pre-determined time as long as voltage is present at 1220. This way repeatedly the switch 1208 switched on and off by the output of 1219. Initially the capacitor 1224 discharges but as soon as its voltage comes below that of voltage across the capacitor 1222 through the diode 1212 voltage is supplied to the winding 1204. The capacitor 1222 is charged by the source 1213. At any given time, if the voltage at the terminal 1230 which represents the spark current at the sparkplug 1202 exceeds the pre-determined value of the pulse at 1219 is terminated and this repeated operation produces series of positive and negative going pulses at the sparkplug. The amplitude of the positive going pulses at the sparkplug 1202 is kept constant by the action of the current feedback at the PWM IC terminal 1230. When the ignition voltage at 1214 is terminated, the pulse output at 1219 also terminated. At this time, the capacitor 1224 charges up through the resistor 1215 because the switch 1208 is now off. Because of this high voltage at 1224, for every input pulse at 1214, initially high voltage appears across the winding 1204. This induces high voltage at the secondary 1201 and initiates spark at the sparkplug 1202.

Figure 13:
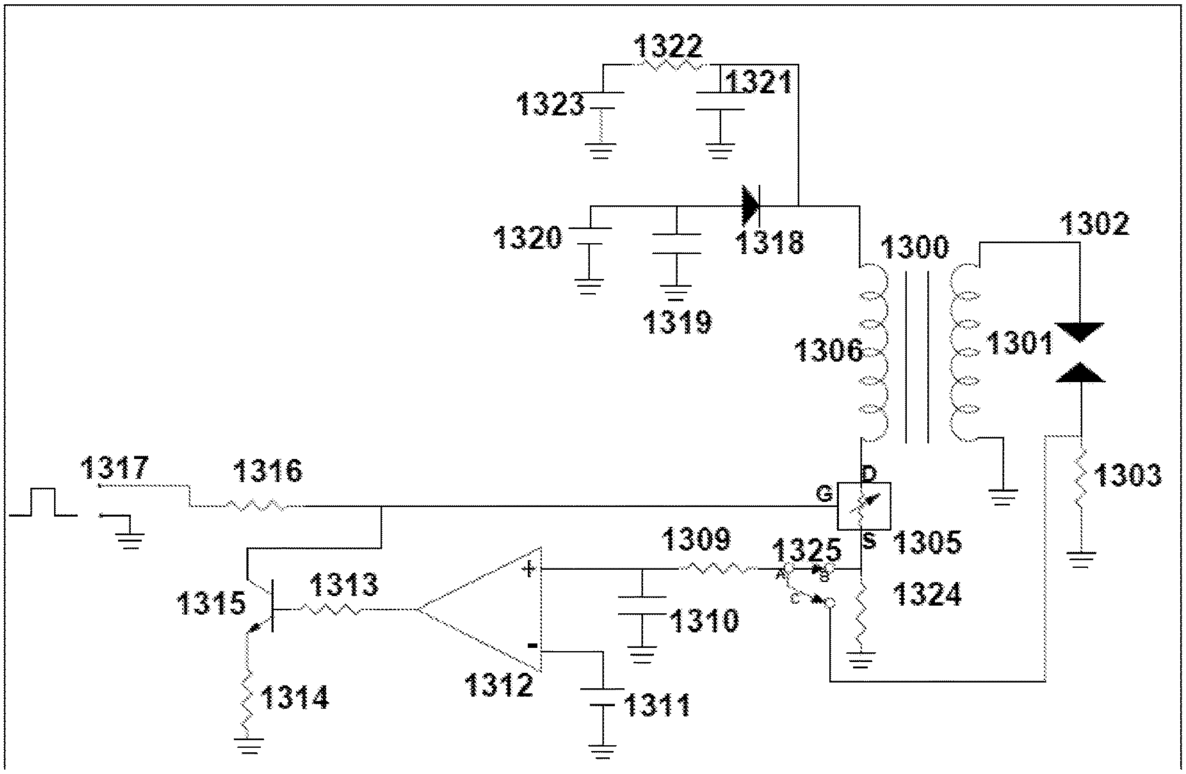
FIG. 13 is a schematic representation of the dual source high energy ignition system with current controlled feedback system to produce constant current through the ignition spark in accordance with an embodiment of the present disclosure.

FIG. 13 is a schematic representation of the dual source high energy ignition system with current controlled feedback system to produce constant current through the ignition spark in accordance with an embodiment of the present disclosure. The positive end of the DC source 1320 is connected to one end of the capacitor 1319. The other end of the capacitor 1319 is grounded. The positive terminal of the source 1320 is also connected to anode of the diode 1318. The cathode of the diode 1318 is connected to one end of the winding 1306 of the transformer 1300. The other end of 1306 is connected to one terminal of the device 1305 operationally. The other terminal of the device 1305 is connected to one end of the resistor 1324 and another end of the resistor 1324 is grounded. The ungrounded end of the resistor 1324 is connected to terminal B of the selector switch. The control terminal G of the device 1305 is connected to one end of the resistor 1316. The other end of the resistor 1316 is connected to the input pulse source 1317. The other terminal of the pulse source 1317 is grounded. The positive terminal of the source 1323 is connected to one end of the resistor 1322 and the other end of the resistor 1322 is connected to one end of the capacitor 1321 and to the cathode of the diode 1318. The other end of the capacitor 1321 is grounded. One end of the winding 1301 of the transformer 1300 is grounded. The other end of the winding 1301 is connected to one end of the sparkplug 1302. The other end of the sparkplug is connected to one end of the resistor 1303 and to one end of the terminal C of the selector switch 1325. The other end of the resistor 1303 is grounded. One end of the resistor 1309 is connected to common terminal A of the selector switch 1325. The other end of the resistor 1309 is connected to one end of the capacitor 1310 and to non-inverting terminal of the op-amp 1312. The other end of the capacitor 1310 is grounded. The positive terminal of the reference voltage 1311 is connected to inverting terminal of the op-amp 1312. The negative terminal of the source 1311 is grounded. The output of the op-amp 1312 is connected to one end of the resistor 1313 and the other end of the resistor 1313 is connected to base of the transistor 1315. The emitter terminal of the transistor 1315 is connected to one end of the resistor 1314. The other end of the resistor 1314 is grounded. The collector of the transistor 1315 is connected to control terminal G of the semiconductor device 1305. The selector switch 1325 terminal A can be connected to terminal B or terminal C.

FIG. 13 shows another configuration for the high energy ignition system. In this, the ignition pulse 1317 is applied to the terminal G of the semiconductor device 1305 through the resistor 1316. This makes the current flow through the winding 1306 from the capacitor 1321 and through the device 1305. This induces positive voltage in the secondary 1301 of the transformer 1300. This ignites the spark in the sparkplug 1302 and the spark current flows through the resistor 1303. The positive voltage developed at terminal A of the selector switch 1325 is filtered using the resistor 1309 and the capacitor 1310. This filtered voltage is compared with the voltage at 1311. The output of the op-amp 1312 controls the conduction of the transistor 1315 and also the voltage applied to the control terminal G of the device 1305. If the voltage across the noninverting terminal of the op-amp 1312 goes above the voltage of the 1311 the voltage at G of the device 1305 is reduced and vice-versa. This negative feedback maintains the current through the spark at a constant level by adjusting the voltage across the device 1305. Initially, the capacitor 1321 delivers high voltage to the winding 1306 when the device 1305 is turned on. This induces high voltage in the winding 1301 and initiates the spark in the sparkplug 1302. However, the voltage across the capacitor 1321 decreases fast because the resistor 1322 charges the capacitor 1321 from the source 1323 slowly. Once the voltage across the capacitor 1321 comes to the level of voltage across the capacitor 1319, the diode 1318 conducts and delivers current to the winding 1306 of the transformer 1300. The capacitor 1319 is charged by the source 1320. The voltage at terminal A of the switch 1325 is maintained constant by the said feedback mechanism by effectively varying the voltage across the device 1305. When the pulse at 1317 is terminated the device 1305 also switched off.

Figure 14:
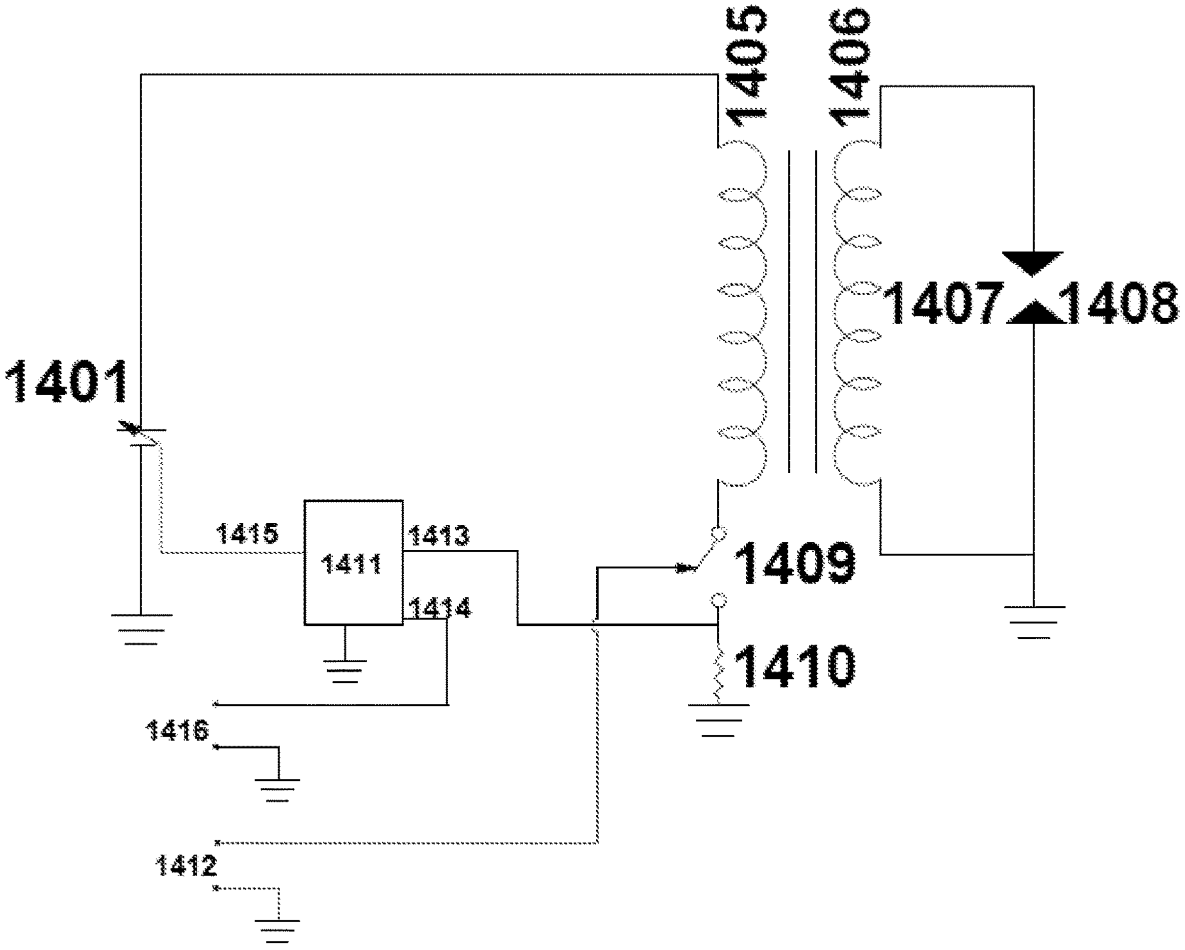
FIG. 14 is a schematic representation of the dual source high energy ignition system with current feedback system to maintain constant current through the spark by varying the applied voltage in accordance with an embodiment of the present disclosure.

FIG. 14 is a schematic representation of the dual source high energy ignition system with current feedback system to maintain constant current through the spark by varying the applied voltage in accordance with an embodiment of the present disclosure. One end of the variable dc voltage source 1401 negative is grounded. The other end of the said source 1401 is connected to one end of the transformer 1406 primary 1405. The other end of the primary 1405 is connected to one end of the switch 1409. The other end of the switch 1409 is connected to one end of the resistor 1410. The other end of the resistor 1410 is grounded. The control terminal of the switch 1409 is connected to one end of the input pulse source 1412. The other end of the pulse source 1412 is grounded. The ungrounded end of the resistor 1410 is also connected to the terminal 1413 of the feedback controller 1411. The other input terminal 1414 of the feedback controller 1411 is connected to one end of the input reference voltage terminal 1416. The other end of the said terminal is connected to ground. The output terminal of the feedback controller 1411 is connected to control terminal of the source 1401. One end of the secondary 1407 of the transformer 1406 is grounded. The other end of the secondary winding 1407 is connected to one end of the sparkplug 1408. The other end of the sparkplug 1408 is grounded.

The input pulse source 1412 provides required pulse to the control terminal of the switch 1409 and turns on the switch 1409. This makes the current to flow through the switch 1409 from the source 1401 and through the resistor 1410 and through the primary 1405 of the transformer 1406. This induces voltage in the secondary 1407 and initiates spark in the sparkplug 1408. Simultaneously to the feedback controller 1411 DC reference voltage is applied to the terminal 1414. The feedback controller 1411 receives the voltage generated across the resistor 1410 at its terminal 1413. The feedback controller compares the voltage at terminal 1413 and the reference voltage 1416 at 1414 and varies the voltage at terminal 1415 and this voltage is applied to the control terminal of the power supply 1401. The power supply 1401 output voltage is varied in such a way that the voltage at the feedback controller 1411 terminal 1414 and 1413 are always equal. This way the current flowing through the sparkplug 1408 is controlled indirectly by the voltage at the input terminal 1416

Figure 15:
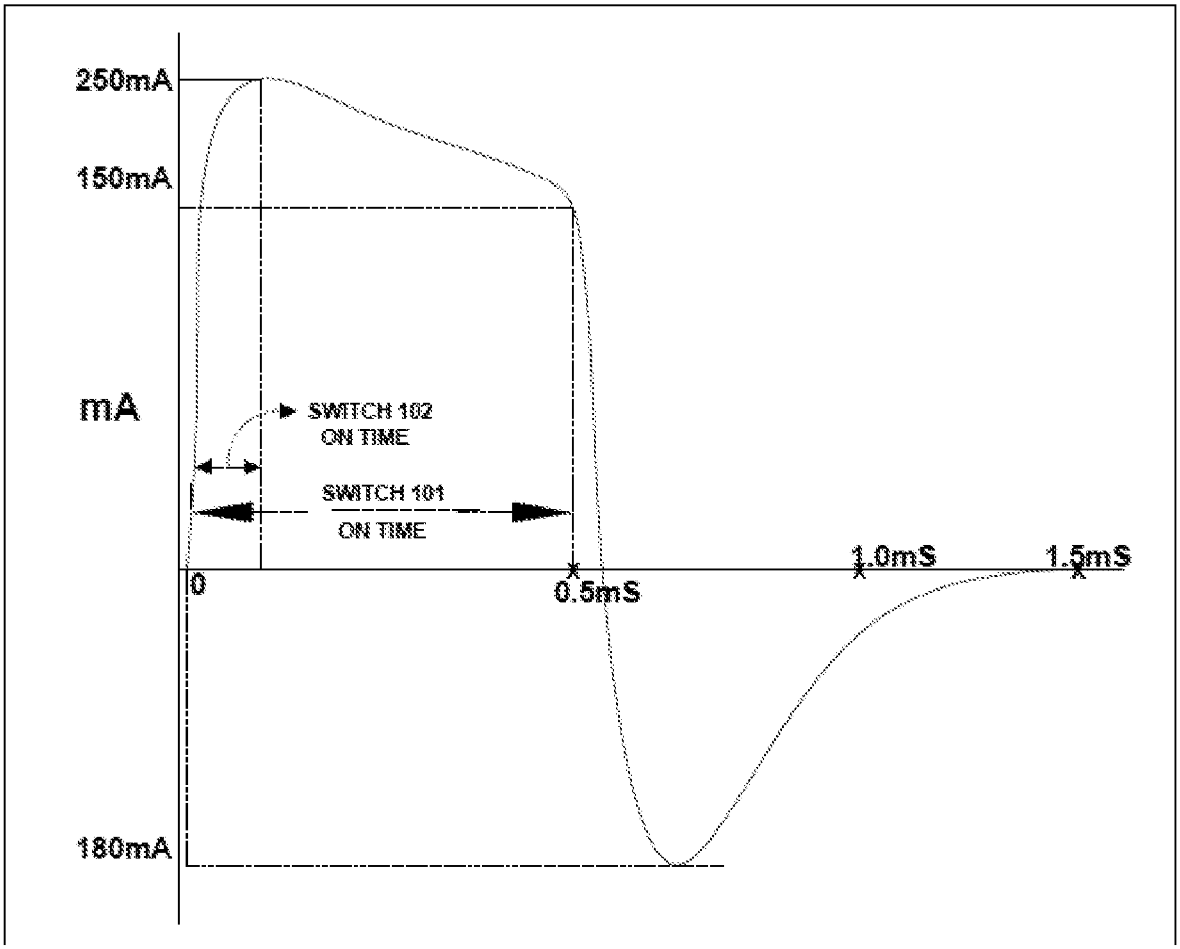
FIG. 15 is a schematic representation of one embodiment of the ignition system of FIG. 1, depicting the practically obtained typical waveform for FIG. 1 in mode-1 in accordance with an embodiment of the present disclosure.

FIG. 15 is a schematic representation of one embodiment of the ignition system of FIG. 1, depicting the practically obtained typical waveform for FIG. 1 in mode-1 with switch 160 on, in accordance with an embodiment of the present disclosure. The current passing through the sparkplug of 1 mm gap is depicted as a waveform. Here, the circuit in FIG. 1 is used practically in mode-1. The low voltage DC is set at 50 volt and high voltage DC is set at 300 volt DC. The high voltage step up transformer having a ratio of 1:80 is used with total resistance in the secondary sparkplug circuit as 10K ohms. The positive side wave form is during the primary current is on and the negative side waveform is due to the stored energy in the transformer when the primary current is put off.

Figure 16:
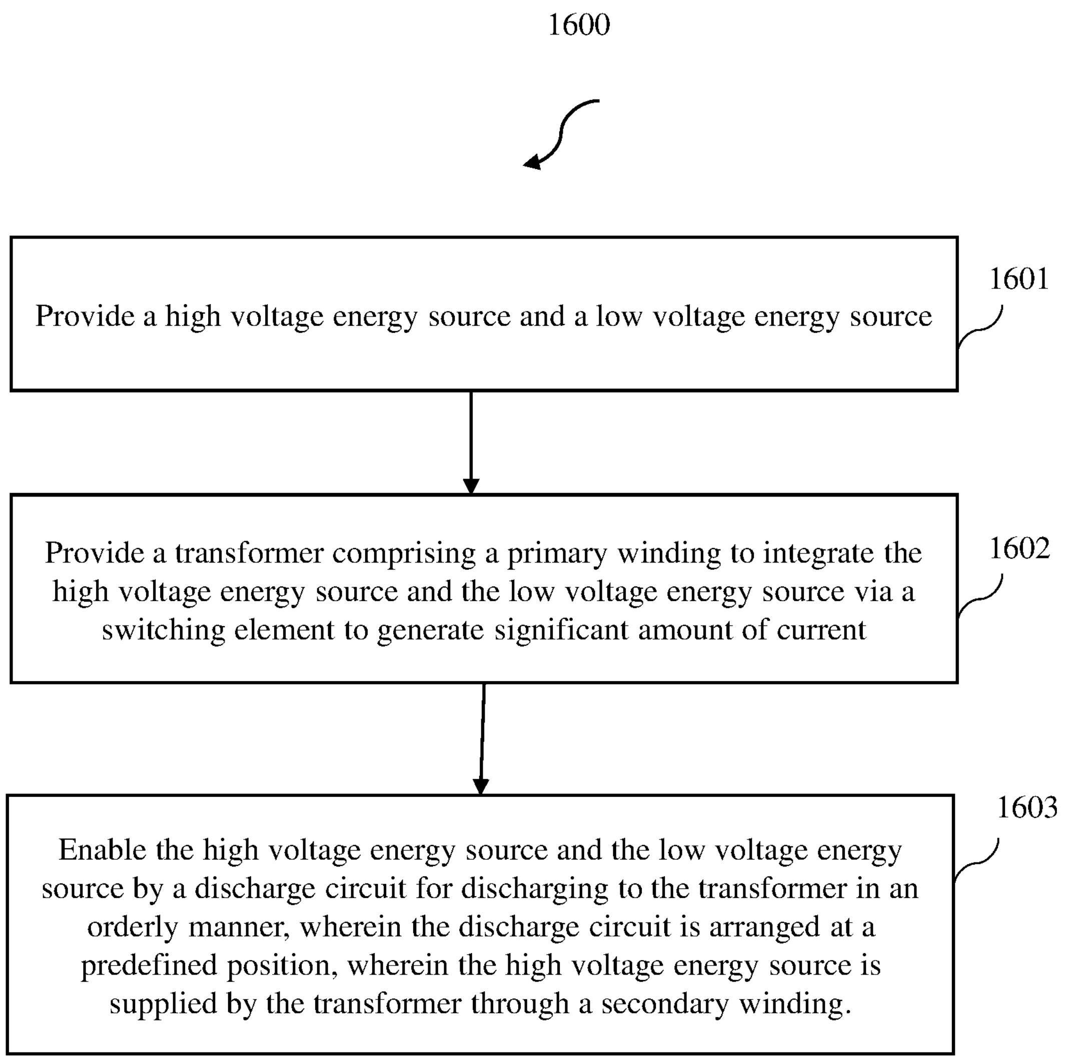
FIG. 16 is a flow chart representing the steps involved in a method for assembling the ignition system in accordance with an embodiment of the present disclosure.

FIG. 16 is a flow chart representing the steps involved in a method 1600 for assembling the ignition system in accordance with an embodiment of the present disclosure. The method 1600 includes providing a high voltage energy source and a low voltage energy source in step 1601. The method 1600 also includes providing a transformer comprising a primary winding to integrate the high voltage energy source and the low voltage energy source via a switching element to generate significant amount of current in step 1602. The method 1600 further includes enabling the high voltage energy source and the low voltage energy source by a discharge circuit for discharging to the transformer in an orderly manner, wherein the discharge circuit is arranged at a predefined position, wherein the high voltage energy source is supplied by the transformer through a secondary winding in step 1603.

Various embodiments of the ignition system with dual energy source described above enables use of spark initiating transformer to deliver additional energy to the spark. The system enables generation of large current to the ignition system used in the internal combustion engine using an integrated method wherein high voltage spark initiating source and low voltage additional current adding source are integrated in a cost effective manner. The system enables quick rise time of the very high voltage which immediately breaks down the spark gap, preventing the voltage from slowly dissipating in the circuit. This provides the ability to fire fouled plugs or larger gaps.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown, nor do all of the acts need to be necessarily performed. Also, those acts that are not dependent on other acts may be performed in parallel with the other acts. The scope of embodiments is by no means limited by these specific examples.

We claim:

1. A dual energy ignition system (10) comprising: a high voltage energy source (103) a low voltage energy source (104) a transformer (150) comprising a primary winding (110) configured to integrate the high voltage energy source and the low voltage energy source via a switch element to generate significant amount of current; and an energy delivery circuit is arranged at a predefined position to enable the high voltage energy source (103) and the low voltage energy source (104) for delivering energy to a sparkplug (112) in an orderly manner, wherein the high voltage energy is supplied by the transformer (150) through a secondary winding (109), wherein the high voltage energy source (103) initiates a spark, and the low voltage energy source (104) adds additional energy to the spark and the initiation of the spark and adding of the additional energy to the spark are carried out while the primary winding (110) of the transformer (150) is conducting, wherein the high voltage energy source (103) current is limited in one mode using the transistor (153) and its associated circuit, wherein the high voltage energy source (103) in yet another mode delivers energy to the transformer (110) with the recovered energy from the diode (105) without receiving energy from the source (180).

2. The system as claimed in claim 1, wherein the high voltage energy source and the low voltage energy source are integrated using a transformer with two primary windings and the switching elements, wherein two primary windings comprises a first primary winding and a second primary winding, wherein the first primary winding configured to initiate spark by delivering energy from the source and the second primary winding is configured to add additional energy to the spark by delivering energy from the source.

3. The system of claim 1, wherein the high voltage energy source and a low voltage source are integrated using the transformer and two switching elements, wherein the two switching elements comprises a first switching element and the second switching element, wherein the first switching element is configured to discharge a first capacitor to the primary to initiate the spark and the second switching element is configured to discharge a second capacitor to the primary to add additional energy to the spark.

4. The system as claimed in claim 1, wherein the high voltage energy source and the low voltage energy source are integrated using the transformer and the two switching elements, wherein the first switching element is configured to discharge first capacitor to the first primary winding to initiate the spark and the second switching element is configured to discharge the second capacitor to the second primary to add additional energy to the spark.

5. The system as claimed in claim 1, wherein the first primary winding is split into two equal parts, and wound on two outer legs of an E-I core transformer thereby preventing the magnetic flux to flow through the center winding of the E-I core transformer due to the said first primary windings.

6. The system as claimed in claim 1, wherein the high voltage energy source and the low voltage energy source are integrated using the transformer and the two switching elements, wherein the first switching element enables the current to flow through a non-interactively wound transformer primary winding to initiate the spark and the second switching element enables additional current to flow through the second primary winding to add additional energy to the spark.

7. The system as claimed in claim 1, wherein the high voltage energy source and the low voltage energy source are integrated using the transformer and two switching elements, wherein the first switching element discharges the first capacitor through the non-interactively wound transformer primary winding to initiate the spark and the second switching element discharges the capacitor to add additional energy to the spark.

8. The system as claimed in claim 1, wherein the high voltage energy source and the low voltage energy source are integrated using the transformer and the four switching elements, where in initially the switching elements, are turned on and switching element is turned off to initiate the spark and add additional energy to the spark from the voltage applied to the primary from the source due to the sustained positive feedback action of the secondary winding, wherein the switching element enables suspension of oscillations, wherein the switching elements, are turned off and pulse applied for the pre-determined time from the pulse source applies high voltage in the primary for a short time from the source and then adds additional energy to the spark once voltage across the capacitor drops down.

9. The system as claimed in claim 1, wherein the high voltage energy source and the low voltage energy source are integrated using the transformer, wherein first the switch are turned on to apply high voltage from the capacitor to initiate the spark through the transformer and low voltage is applied to the winding as the voltage across the capacitor comes down, to add additional energy to the spark, and the system delivers energy to the capacitor from the recovered energy from the winding when the switch is off and delivers energy to the capacitor from the source when the switch is turned on.

10. The system as claimed in claim 1, wherein the high voltage energy source and the low voltage energy source are integrated using the transformer wherein the ignition pulse is applied to the switches to turn on and off alternatively to produce a series of short pulses of positive and negative polarity in the primary for the required duration using the said two switches in a push pull configuration, wherein the unit can be operated with switch turned on to deliver high voltage from the source.

11. The system as claimed in claim 1, wherein the high voltage energy source and the low voltage energy source are integrated using the transformer wherein ignition pulses are applied by turning on the switches alone to produce positive pulse across the transformer primary to produce spark in one direction and the switches, alone are turned on to produce spark in the opposite direction, wherein the switching element is turned on to deliver high voltage initially from the source and the switch turned off to develop high voltage across the capacitor from the recovered energy from the transformer.

12. The system as claimed in claim 1, wherein the high voltage energy source and the low voltage energy source are integrated using the transformer, wherein the pulse source turns on the PWM IC to produce series of current controlled pulses across the switch to turn on and off the primary of the transformer to produce positive and negative going current controlled spark at the sparkplug through the secondary.

13. The system as claimed in claim 1, wherein the high voltage energy source and the low voltage energy source are integrated using the transformer, wherein the applied voltage is continuously varied by varying the resistance of the switch by negative feedback mechanism using the current through the resistor or through the resistor to get the required spark current.

14. The system as claimed in claim 1, wherein the high voltage energy source and the low voltage energy source are integrated using the transformer, wherein by comparing the ignition current with reference level the applied source voltage is varied linearly using the negative feedback, to produce the required current wave form for the spark when the switch is on.

15. A method comprising:

providing a high voltage energy source and a low voltage energy source;

providing a transformer comprising a primary winding to integrate the high voltage energy source and the low voltage energy source via a switching element to generate significant amount of current; and enabling the high voltage source and the low voltage energy source by a discharge circuit for discharging to the transformer in an orderly manner, wherein the discharge circuit is arranged at a predefined position, wherein the high voltage energy source is supplied by the transformer through an auxiliary secondary winding.

* * * * *